(12) United States Patent
Uhlich et al.

(10) Patent No.: US 12,245,020 B2
(45) Date of Patent: Mar. 4, 2025

(54) ELECTRONIC DEVICE, METHOD AND COMPUTER PROGRAM

(71) Applicant: Sony Group Corporation, Tokyo (JP)

(72) Inventors: Stefan Uhlich, Stuttgart (DE); Michael Enenkl, Stuttgart (DE)

(73) Assignee: SONY GROUP CORPORATION, Tokyo (JP)

(*) Notice: Subject to any disclaimer, the term of this patent is extended or adjusted under 35 U.S.C. 154(b) by 200 days.

(21) Appl. No.: 17/907,988

(22) PCT Filed: Feb. 26, 2021

(86) PCT No.: PCT/EP2021/054930
§ 371 (c)(1),
(2) Date: Aug. 30, 2022

(87) PCT Pub. No.: WO2021/175735
PCT Pub. Date: Sep. 10, 2021

(65) Prior Publication Data
US 2023/0164510 A1  May 25, 2023

(30) Foreign Application Priority Data
Mar. 6, 2020 (EP) .................................. 20161654

(51) Int. Cl.
*H04S 7/00* (2006.01)
(52) U.S. Cl.
CPC ........... *H04S 7/307* (2013.01); *H04S 2400/11* (2013.01); *H04S 2400/13* (2013.01)
(58) Field of Classification Search
CPC ................. H04S 7/307; H04S 2400/11; H04S 2400/13
USPC ....................................... 381/56, 58, 86, 302
See application file for complete search history.

(56) References Cited

U.S. PATENT DOCUMENTS

| | | | |
|---|---|---|---|
| 8,190,438 B1 | 5/2012 | Nelissen | |
| 2009/0076637 A1 | 3/2009 | Kameyama | |
| 2009/0287479 A1* | 11/2009 | Szczerba | G10L 19/022 704/211 |
| 2011/0040707 A1 | 2/2011 | Theisen et al. | |
| 2012/0114130 A1 | 5/2012 | Lovitt | |
| 2015/0053066 A1* | 2/2015 | Hampiholi | B60K 35/10 84/602 |
| 2019/0213429 A1 | 7/2019 | Sicconi et al. | |
| 2020/0364663 A1* | 11/2020 | Colella | G01C 21/20 |
| 2023/0273290 A1* | 8/2023 | Eronen | H04S 7/304 342/451 |

FOREIGN PATENT DOCUMENTS

| | | |
|---|---|---|
| CN | 106911763 A | 6/2017 |
| EP | 3401905 A1 | 11/2018 |

OTHER PUBLICATIONS

International Search Report and Written Opinion mailed on May 31, 2021, received for PCT Application PCT/EP2021/054930, filed on Feb. 26, 2021, 10 pages.
"Audio Definition Model", ITU-R, BS Series, Broadcasting Service (sound), BS.2076-1, Jun. 2017, pp. 1-104.

* cited by examiner

*Primary Examiner* — William A Jerez Lora
(74) *Attorney, Agent, or Firm* — XSENSUS, LLP

(57) ABSTRACT

An electronic device having circuitry, which is configured to estimate a distraction level of an audio object stream, and to modify the audio object stream based on the estimated distraction Audio object level to obtain a modified audio object stream.

20 Claims, 17 Drawing Sheets

ELECTRONIC DEVICE, METHOD AND COMPUTER PROGRAM

CROSS-REFERENCE TO RELATED APPLICATIONS

The present application is based on PCT filing PCT/EP2021/054930, filed Feb. 26, 2021, which claims priority to EP 20161654.7, filed Mar. 6, 2020, the entire contents of each are incorporated herein by reference.

TECHNICAL FIELD

The present disclosure generally pertains to the field of audio processing, and in particular, to devices, methods and computer programs for distraction level minimization.

TECHNICAL BACKGROUND

There is a lot of audio content available, for example, in the form of compact disks (CD), tapes, audio data files which can be downloaded from the internet, but also in the form of sound tracks of videos, e.g. stored on a digital video disk or the like, etc.

In an automotive environment, different driving/passengers situations may occur where the playback of audio content is disturbing, which poses safety problems (e.g., harsh sounds from the back during driving a car). However, there exist ways to minimize a distraction level of an audio stream, by analyzing the distraction level and adapting the playout accordingly, for example by reducing the volume of music played back by the vehicle audio system.

With the arrival of spatial audio object oriented systems like Dolby Atmos, DTS-X or more recently Sony 360 Reality Audio (360RA), there is a need to find some methods to reduce possible safety problems of playing back 360RA audio material in the automotive field. Especially because the audio content created in 360RA format (MPEG-H) could contain disruptive sounds (e.g., impulsive effect from the door sides or voices from the back) which can be localized by the driver and, hence, could cause distraction.

Although there exist techniques for audio object stream modification, it is generally desirable to improve devices and methods for audio object stream modification.

SUMMARY

According to a first aspect, the disclosure provides an electronic device comprising circuitry configured to estimate a distraction level of an audio object stream, and to modify the audio object stream based on the estimated distraction level to obtain a modified audio object stream.

According to a second aspect, the disclosure provides a method comprising estimating a distraction level of an audio object stream and modifying the audio object stream based on the estimated distraction level to obtain a modified audio object stream.

According to a third aspect, the disclosure provides a computer program comprising instructions, the instructions when executed on a processor causing the processor to estimate a distraction level of an audio object stream, and to modify the audio object stream based on the estimated distraction level to obtain a modified audio object stream.

Further aspects are set forth in the dependent claims, the following description and the drawings.

BRIEF DESCRIPTION OF THE DRAWINGS

Embodiments are explained byway of example with respect to the accompanying drawings, in which:

FIG. 12a shows a flow diagram visualizing an exemplary method for performing audio stream modification as described in FIG. 2a;

DETAILED DESCRIPTION OF EMBODIMENTS

Figure 1:
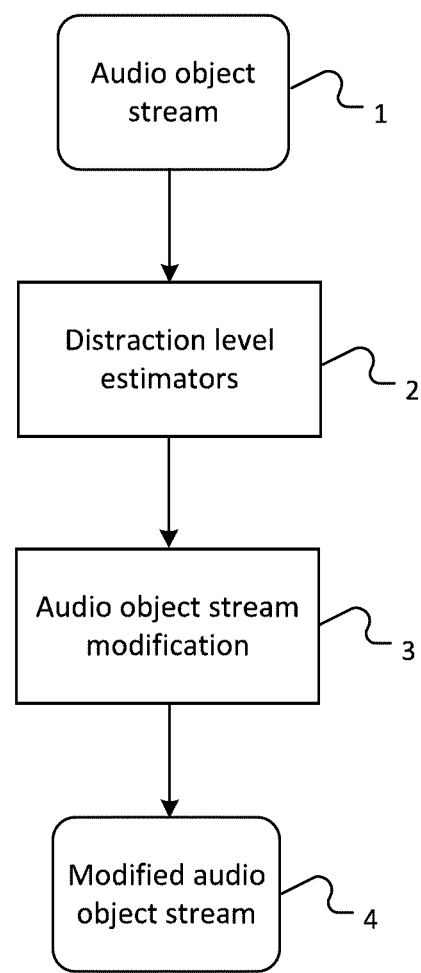
FIG. 1 schematically illustrates an exemplary method in accordance with the present disclosure.

Before a detailed description of the embodiments under reference of FIGS. 1 to 15 is given, some general explanations are made.

The embodiments disclose an electronic device comprising circuitry configured to estimate a distraction level of an audio object stream, and to modify the audio object stream based on the estimated distraction level to obtain a modified audio object stream.

The electronic device may for example be an electronic control unit (ECU) within the vehicle. ECUs are typically used in vehicles e.g. as a Door Control Unit (DCU), an Engine Control Unit (ECU), an Electric Power Steering Control Unit (PSCU), a Human-Machine Interface (HMI), a Powertrain Control Module (PCM), a Seat Control Unit, a Speed Control Unit (SCU), a Telematic Control Unit (TCU), a Trans-mission Control Unit (TCU), a Brake Control Module (BCM; ABS or ESC), a Battery Management System (BMS), and/or a 3D audio rendering system. The electronic device may be an ECU that is specifically used for the purpose of controlling a vehicle audio system. Alternatively, an ECU that performs any of the functions described above, or any other function, may be used simultaneously for the purpose of controlling a vehicle audio system. Moreover, the electronic device may for example be a smart speaker capable of voice interaction, music playback, making to-do lists, setting alarms, streaming podcasts, playing audiobooks, providing weather, traffic, sports, and other real-time information, such as news or the like. The electronic device may also have the functions of a home automation system, for example, for playback in a living room. The electronic device may thus provide audio content, such as a modified audio object stream having a reduced distraction level, consisting of spatial audio objects, such as audio monopoles or the like.

The circuitry of the electronic device may include a processor, may, for example, be a CPU, a memory (RAM, ROM or the like), and/or storage, interfaces, etc. Circuitry may also comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc. Furthermore, the electronic device may be an audio-enabled product, which generates some multi-channel spatial rendering. The electronic device may be an audio-object playback system e.g. a 360RA head-unit in automotive environment, Home A/V receivers, TV, soundbar, multi-channels (playback) system, virtualizer on headphones, Binaural Headphones, or the like.

An audio object stream, such as audio formats like 360 Reality Audio (360RA), is object-based instead of channel-based. The audio format, which is object-based (MPEG-H), may contain sound sources at arbitrary positions on a sphere. Thereby, sound sources are placed at arbitrary positions in the three-dimensional (3D) space, and this may give the content creator more flexibility in his artistic process. The audio stream may be obtained over a communication bus in a vehicle, from a multimedia system within the vehicle, from a digital radio receiver, from an MPEG player, a CD player, or the like. Besides 360RA, there are also other audio formats (Dolby Atmos, Auro3D, . . . ) which allow placing audio sources in the full 3D space.

3D audio may manipulate the sound produced by stereo speakers, surround-sound speakers, speaker-arrays, or headphones and involves the virtual placement of sound sources anywhere in three-dimensional space, including behind, above or below the listener. In this way, individual sounds such as vocals, chorus, piano, guitar, bass and even sounds of the live audience can be placed in a e.g. 360 spherical sound field.

There are different specifications for coding 3D audio, for example MPEG-H 3D Audio (ISO/IEC 23008-3, MPEG-H Part 3), Dolby Digital (AC-3), MP3, AAC, 360 Reality Audio, etc. All these specifications support coding audio as audio objects, audio channels, Ambisonics (HOA), etc. Channels, objects, and Ambisonics components may be used to transmit immersive sound as well as mono, stereo, or surround sound.

From a data coding point of view, audio objects consist of audio data which is comprised in the audio object stream as an audio bitstream plus associated metadata (object position, gain, etc.). The audio bitstream may, for example, be encoded according to an audio bitstream format such as the Waveform Audio File Format (WAV) or a compressed audio bitstream such as MP3 or the like.

The circuitry may be further configured to evaluate the decision tree to determine a list of actions. For example, the list of actions may include an amplitude reduction of an audio object, a lowpass/median filtering, a modification of position, and/or the like. The list of actions may contain any number of actions, for example, the list of actions may contain one action or more than one actions. The list of actions may be determined for each set of distraction levels by evaluating the decision tree. Additionally, the list of actions may be applied to one or any number of audio objects in the stream.

The circuitry may be further configured to perform an action block to obtain the modified audio object stream. The action block may execute, on the audio object stream, the list of actions determined by the decision tree to obtain the modified audio object stream.

The circuitry may be configured to estimate a distraction level of an audio object stream, such as for example, a position distraction level, an aural distraction level, a distance estimation, and/or the like.

The circuitry may be configured to modify the audio object stream based on the estimated distraction level to obtain a modified audio object stream. The modified audio object stream may be an audio object stream with minimized distraction levels, and thereby, for example, distraction from the driving situation in a car may be reduced, or stress in a home environment for sick people may be prevented, for example, the playback may be adapted to avoid high stress levels for persons with a heart disease, or the like.

In some embodiments, the circuitry may be further configured to modify the audio object stream based on the estimated distraction level by an audio object stream modification including a decision tree. The audio object stream modification may be an audio object stream modifier, which includes for example a decision tree for determining a list of actions and/or an action block for modifying the audio object stream by executing the list of actions on the audio object stream, or the like.

The circuitry may be configured to perform a field of listening evaluation on the audio object stream to estimate a position distraction level. For example, the field of listening of a user may be divided in regions, wherein each region may be associated with a different position distraction level. For performing the field of listening evaluation, the coordinates of audio objects, such as audio monopoles or the like, may be extracted to obtain audio object positions in the 3D space. The circuitry may be further configured to perform coordinate extraction to obtain coordinates of an audio object in the audio object stream, wherein the coordinates of an audio object may represent a field of listening. The field of listening evaluation may estimate the position distraction level based on extracted coordinates of an audio object in the audio object stream.

Additionally, or alternatively, the circuitry may be configured to perform a sound signature estimation on the audio object stream to estimate an aural distraction level. For performing the sound signature estimation, a bitstream is extracted from the audio object stream. The audio bitstream may be encoded according to e.g. the Waveform Audio File Format, WAV, or the like. For performing the sound signature estimation, a sound signature estimator analyzes the spectral and temporal characteristics of the audio objects, to estimate an aural distraction.

The sound signature estimation may also comprise performing a transient detection. Alternatively, sound signature estimation may also be performed by determining a normalized energy, or by using a neural network detector or the like. The neural network detector may be implemented by a neural network, such as a Deep Neural Network (DNN) or the like.

Additionally, or alternatively, the circuitry may be configured to perform a distance calculation on the audio object stream to obtain a distance estimation. A distance calculator may estimate a perceived distance. For example, in an in-vehicle scenario, the perceived distance may be a distance between a position of a driver (x,y,z) and a position of an audio object (x,y,z) of the audio object stream. A distance distraction level may be estimated based on the distance estimation. The distance calculation may be performed by extracting spatial, temporal and spectral characteristics while analyzing an audio object stream. The distance estimation may comprise a perceived distance, a perceived velocity vector, a cross-correlation, an auto-correlation related to an audio bitstream, and/or the like.

The circuitry may be further configured to extract coordinates and ab audio bitstream to obtain the perceived distance, the perceived velocity vector, the cross-correlation, and/or the auto-correlation.

The circuitry may be further configured to perform a driving situation analysis based on acquired vehicle data to estimate a driving situation. A driving distraction level may be estimated based on the estimated driving situation. The estimated driving situation may express the criticalness of the current driving situation by concerning different kind of vehicle data. For example, if the current driving situation is estimated as critical, the modified audio object stream may be an audio object stream with minimized distraction levels related to the driving situation in a car. The vehicle data may be data acquired by various sensors inside and outside a vehicle. The in-vehicle sensors may be, for example, a sensor array that comprises a plurality of sensors, each one arranged at a respective seat of the vehicle. The plurality of sensors may be any kind of sensors such as a pressure sensor capable of obtaining a respective presence of passengers/driver at the front and rear seats of the vehicle. The vehicle data may be collected, for example, from a cloud regarding traffic situation, traffic lights and the like. The sensors outside the vehicle may be Time-of-Flight sensors, ultrasonic sensors, radar device and the like. The vehicle data may be stored in a database and collected from the database.

The circuitry may be further configured to perform a song history analysis on a history of songs to estimate a novelty factor related to the audio object stream. The novelty factor which is related to the audio object stream may be estimated based on a history of songs, for example, by comparing the audio object stream and a history of songs which is e. g. stored in a database, for example a user's playlist or the like. The novelty factor may express how familiar a driver is with an audio material, such as a song that is played-back, and thus, a novelty distraction level may be estimated based on the novelty factor. A user's distraction may be higher for a new audio material than for an older audio material. In particular, the novelty factor depends on how often the user has heard the song, for example, for the user's distraction may be higher for a song that the user has heard one or two times and lower for a song that the user has heard many times. Determining whether or not the audio object stream is new may for example be realized by comparing the novelty factor with a predefined threshold value, for example with a value 0.5, or the like. For example, if the estimated novel factor is more than 0.5, the song that is played-back is considered as new audio material, and thus, the user's distraction level may be high. If the estimated novel factor is less than 0.5, the song that is played-back is considered that the user is familiar with that song, and thus, the user's distraction level may be low.

In one embodiment, the circuitry may be further configured to perform distraction minimization in the audio object stream to obtain the modified audio object stream. The modified audio object stream may have a distraction minimization by which the distraction/stress that is caused by object-audio material is reduced.

In one embodiment, the circuitry may be further configured to output the modified audio object stream to a loudspeaker system. In particular, the circuitry may be further configured to reduce a distraction level of a driver based on the modified audio object stream outputted to a loudspeaker system of a vehicle.

The embodiments also disclose a method comprising estimating a distraction level of an audio object stream and modifying the audio object stream based on the estimated distraction level to obtain a modified audio object stream.

The embodiments also disclose a computer program comprising instructions, the instructions when executed on a processor causing the processor to estimate a distraction level of an audio object stream, and to modify the audio object stream based on the estimated distraction level to obtain a modified audio object stream.

Embodiments are now described by reference to the drawings.

FIG. 1 schematically illustrates an exemplary method in accordance with the present disclosure. An audio object stream 1 is input to a distraction level estimator 2. The distraction level estimator 2 analyzes the audio object stream 1 to estimate a distraction level of the audio object stream 1. The distraction level of the audio object stream 1 obtained by the distraction level estimator 2 is input to an audio object stream modification 3. Based on the distraction level obtained by the distraction level estimator 2, the audio object stream modification 3 modifies the audio object stream 1 to obtain a modified audio object stream 4.

In an embodiment, the audio object stream 1 encodes audio using a 3D audio technique and thus describes a spatial sound scene by placing sound objects, which describe virtual sound sources, at certain sound object positions in space. For example, the audio object stream 1 may be encoded according to MPEG-H 3D Audio (ISO/IEC 23008-3, MPEG-H Part 3), Dolby Digital (AC-3), MP3, AAC, 360 Reality Audio, etc. The audio object stream 1 encodes audio as audio objects and describes a spatial sound scene by placing audio objects, which describe virtual sound sources, at a certain sound object position in space.

An exemplary process of the distraction level estimation 2 is described in more detail with regard to FIGS. 2 to 6 below. An exemplary process of the audio object stream modification 3 is described in more detail with regard to FIG. 2a below.

Figure 2A:
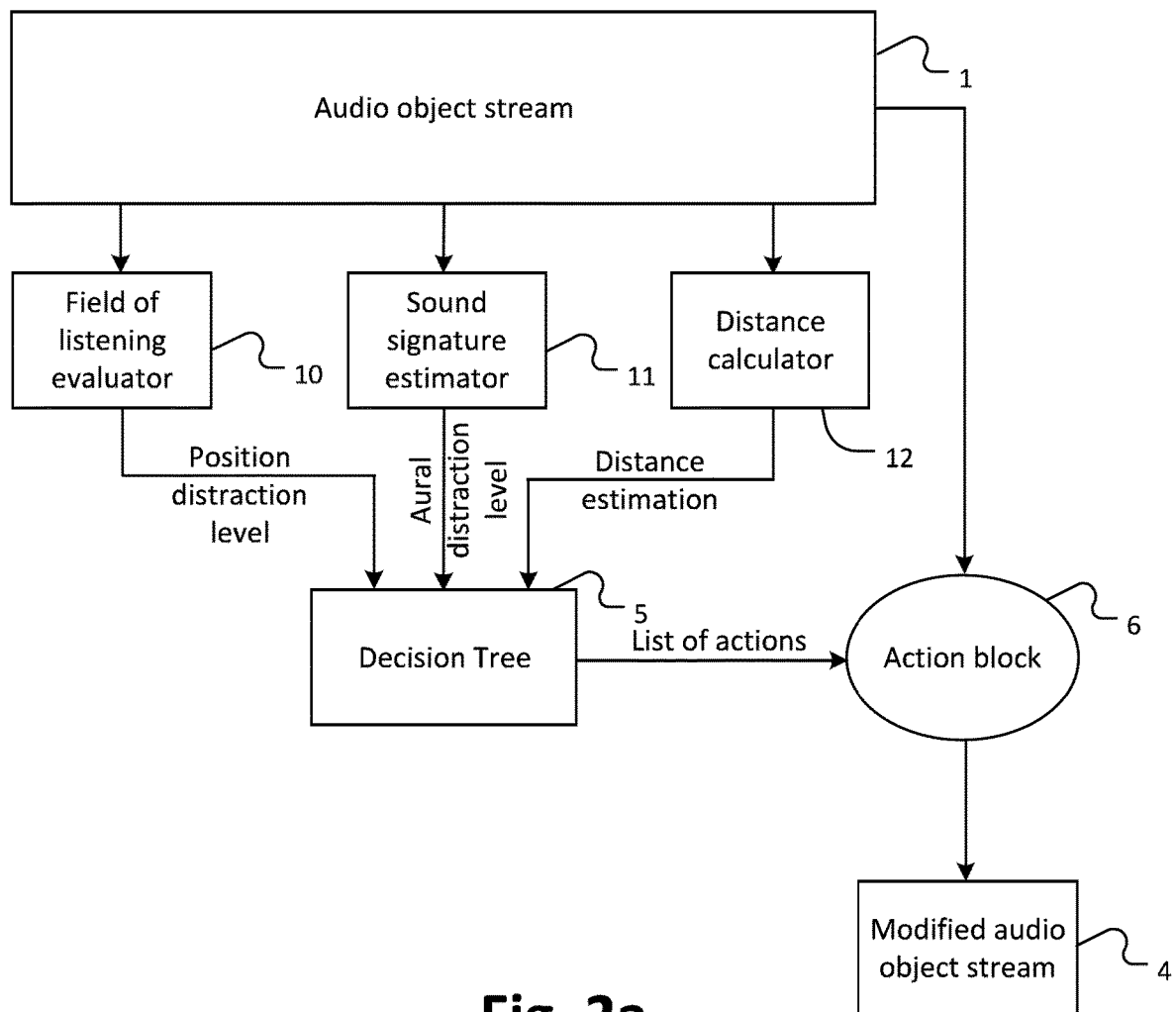
FIG. 2a illustrates an exemplary embodiment of a device implementing a process of a distraction minimization in an audio object stream, as described in FIG. 1.

FIG. 2a illustrates an exemplary embodiment of a device implementing a process of a distraction minimization in an audio object stream such as described in FIG. 1 above. An object-based audio material, such as audio object stream 1, is analyzed by distraction level estimators (see 2 in FIG. 1), namely a field-of-listening estimator 10, a sound signature estimator 11, and a distance calculator 12. Each one of the field of listening estimator 10, the sound signature estimator 11 and the distance calculator 12 estimates a respective distraction level, here a position distraction level, an aural distraction level and a distance estimation, respectively. The estimated distance is related with a distraction level, for example, the bigger the distance, the smaller the distraction level. Based on the estimated position distraction level, the aural distraction level and the distance estimation obtained by the field of listening estimator 10, the sound signature estimator 11 and the distance calculator 12, respectively, the decision tree 5 determines a list of actions. The list of actions output by the decision tree 5 is input to an action block 6 together with the audio object stream 1. Based on the list of actions obtained from the decision tree 5 and based on the audio object stream 1, the action block 6 produces a modified audio object stream 4. In the present embodiment, there are three distraction level estimators, here the field of listening estimator 10, the sound signature estimator 11, and the distance calculator 12, without limiting the present invention in that regard. The number of the distraction level estimators may be one, two, three or more.

Figure 2B:
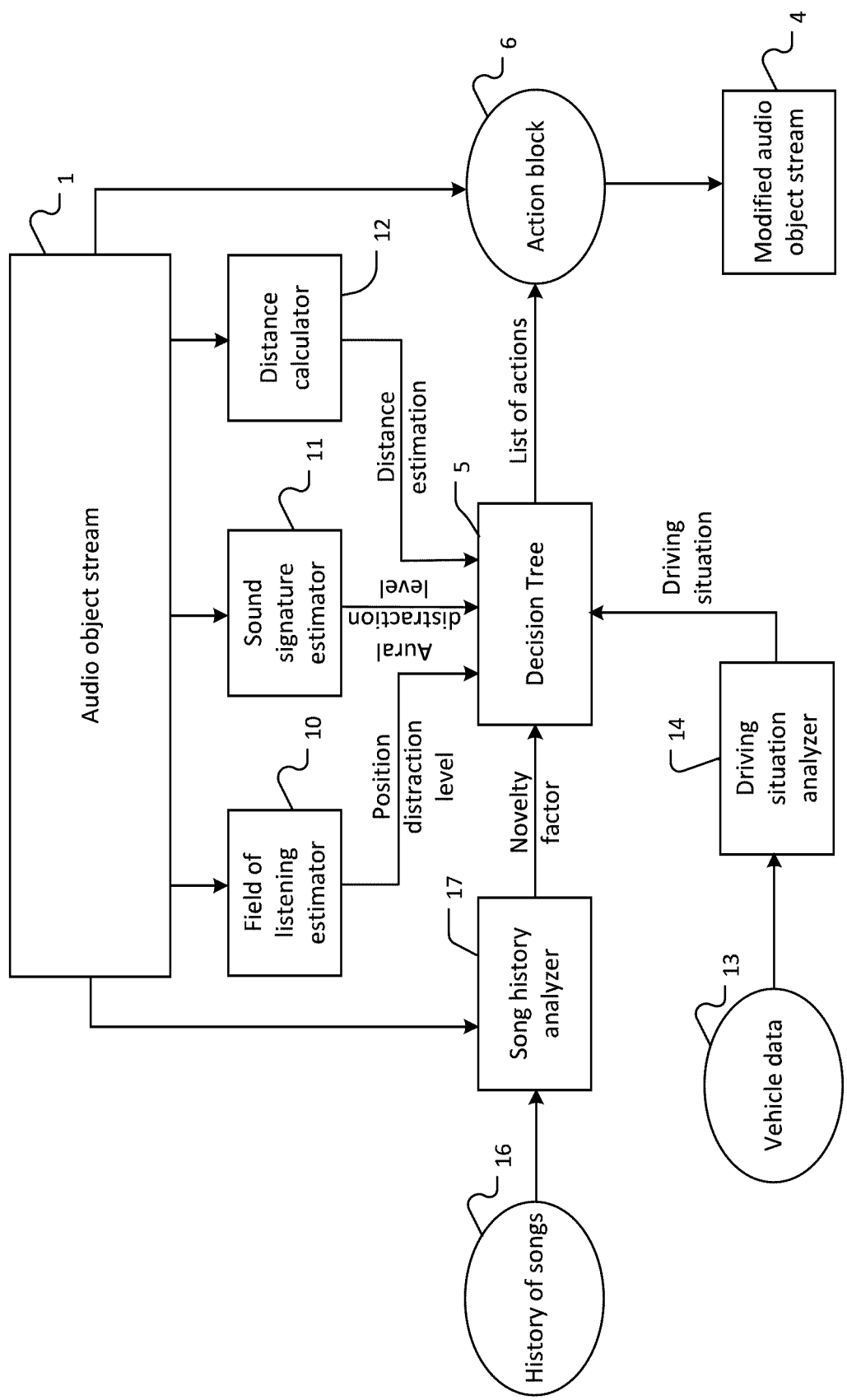
FIG. 2b illustrates another exemplary embodiment of a device implementing a process of a distraction minimization in an audio object stream, as described in FIG. 1.

FIG. 2b illustrates another exemplary embodiment of a device implementing a process of a distraction minimization in an audio object stream such as described in FIG. 1 above. An object-based audio material, such as audio object stream 1, is analyzed by distraction level estimators (see 2 in FIG. 1), namely a field of listening estimator 10, a sound signature estimator 11, and a distance calculator 12. Each one of the field-of-listening estimator 10, the sound signature estimator 11 and the distance calculator 12 estimates a respective distraction level, here position distraction level, an aural distraction level and a distance estimation, respectively. In addition, vehicle data 13 is collected and input to a driving situation analyzer 14, which analyzes and estimates the driving situation. A song history analyzer 17 estimates a novelty factor related to the audio object stream based on a history of songs 16, e.g. by comparing the audio object stream 1 and the history of songs 16 stored in a database. Based on the estimated driving situation obtained by the driving situation analyzer 14, based on the novelty factor obtained by the song history analyzer 17, and based on the position distraction level, the aural distraction level and the distance estimation, obtained by the field-of-listening 10, the sound signature estimator 11 and the distance calculator 12, respectively, the decision tree 5 obtains a list of actions. The list of actions output by the decision tree 5 is input to an action block 6 together with the audio object stream 1. Based on the list of actions obtained from the decision tree 5 and based on the audio object stream 1, the action block 6 obtains a modified audio object stream 4. The action block 6 thus performs a decision tree based audio object stream modification (see 3 in FIG. 1).

Figure 3:
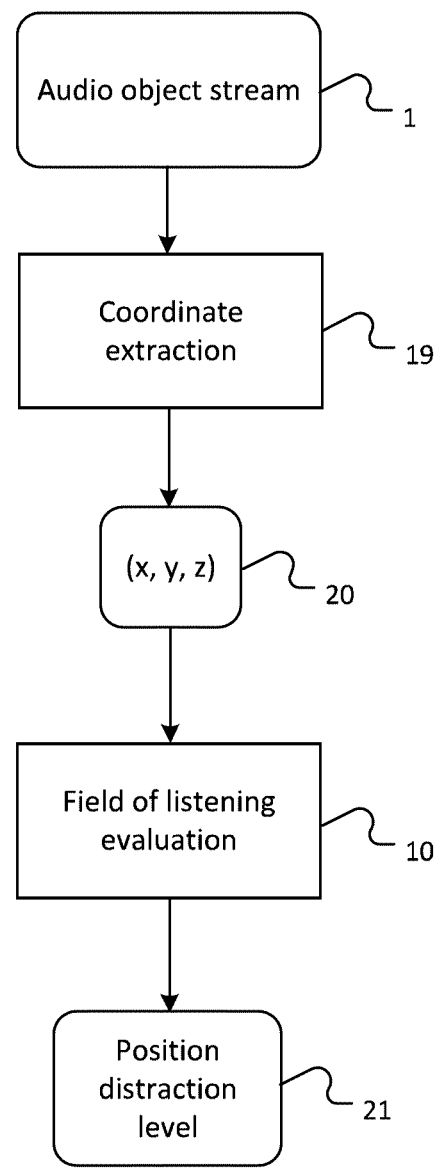
FIG. 3 schematically describes in more detail an embodiment of a field of listening estimation as performed in the process of distraction minimization in an audio object stream described in FIGS. 2a and 2b.

FIG. 3 schematically describes in more detail an embodiment of a field-of-listening estimation as performed in the process of distraction minimization in an audio object stream described in FIGS. 2a and 2b above. An audio object stream 1 is analyzed by a coordinate extraction 19 to obtain coordinates (x, y, z) 20 of an audio object, such as for example an audio monopole, in the audio object stream 1. The coordinates (x, y, z) 20 of the audio object represent a position of the audio object, and thus, a field of listening. Based on the coordinates (x, y, z) 20 of the audio object obtained by the coordinate extraction 19, a field of listening evaluation, which acts as a field of listening estimator 10 (see FIGS. 2a and 2b) estimates a position distraction level 21 of the audio object in the audio object stream 1. The position distraction level 21 is described in more detail in FIG. 4, in the following.

As stated with regard to FIG. 1 above, the audio object stream 1 of the embodiment of FIG. 3 encodes audio using a 3d audio technique. The audio object stream 1 thus encodes audio as audio objects and describes a spatial sound scene by placing audio objects, which describe virtual sound sources at a certain sound object position in space.

As stated in the introductory part of the description, from a data coding point of view, audio objects consist of audio data which is comprised in the audio object stream as an audio bitstream plus associated metadata (object position, gain, etc.). The associated metadata related to audio objects for example comprises positioning information related to the audio objects, i.e. information describing where an audio object should be position in the 3D audio scene. This positioning information may for example be expressed as 3d coordinates (x, y, z) of the audio object (see 20 in FIG. 3). According to the embodiment of FIG. 3, the coordinate extraction 19 obtains the coordinates (x, y, z) of the audio objects within the audio object stream. These extracted coordinates (x, y, z) of the audio objects represent the field of listening in which the driver is immersed.

Audio objects streams are typically described by a structure of a metadata model that allows the format and content of audio files to be reliably described. In the following embodiment, it is described as an example of a metadata model, the Audio Definition Model (ADM) specified in *ITU Recommendation ITU-R BS.2076-1 Audio Definition Model*. This Audio Definition Model specifies how XML metadata can be generated to provide the definitions of audio objects.

As described in ITU-R BS.2076-1, an audio object stream is described by an audio stream format, such as audioChannelFormat including a typeDefinition attribute, which is used to define what the type of a channel is. ITU-R BS.2076-1 defines five types for channels, namely DirectSpeakers, Matrix, Objects, HOA, and Binaural, as described on Table 10 of ITU-R BS.2076-1, which we reproduce below:

TABLE 10 typeDefinitions

| typeDefinition | typeLabel | Description |
| --- | --- | --- |
| DirectSpeakers | 0001 | For channel-based audio, where each channel feeds a speaker directly |
| Matrix | 0002 | For channel-based audio where channels are matrixed together, such as Mid-Side, Lt/Rt |
| Objects | 0003 | For object-based audio where channels represent audio objects (or parts of objects) and so include positional information |
| HOA | 0004 | For scene-based audio where Ambisonics and HOA are used |
| Binaural | 0005 | For binaural audio, where playback is over headphones |

In this embodiment, it is focused on type definition "Objects" which are described in section § 5.4.3.3 of ITU-R BS.2076-1. In this section of ITU-R BS.2076-1 it is described that object-based audio comprises parameters that describe a position of the audio object (which may change dynamically), as well as the object's size, and whether it is a diffuse or coherent sound. The position and object size parameters definitions depend upon the coordinate system used and they are individually described in Tables 14, 15 and 16, of the *ITU Recommendation ITU-R BS.2076-1 Audio Definition Model*.

The position of the audio object is described in a sub-element "position" of the audioBlockFormat for "Objects". ITU-R BS.2076-1 provides two alternative ways of describing the position of an audio object, namely in the Polar coordinate system, and, alternatively, in the Cartesian coordinate system. A coordinate sub-element "cartesian" is defined in Table 16 of ITU-R BS.2076-1 with value 0 or 1. This coordinate parameter specifies which of these types of coordinate systems is used.

TABLE 16 audioBlockFormat sub-elements for Objects

| Sub-element | Attribute | Description | Units | Example | Quantity | Default |
| --- | --- | --- | --- | --- | --- | --- |
| cartesian | | Specifies coordinate system, if the flag is set to 1 the Cartesian coordinate system is used, otherwise spherical coordinates are used. | 1/0 flag | 1 | 0 or 1 | 0 |
| gain | | Apply a gain to the audio in the object | linear gain value | 0.5 | 0 or 1 | 1.0 |
| diffuse | | Describes the diffuseness of an audioObject (if it is diffuse or direct sound) | 0.0 to 1.0 | 0.5 | 0 or 1 | 0 |

If the "cartesian" parameter is zero (which is the default), a Polar Coordinate system is used. Thus, the primary coordinate system defined in ITU-R BS.2076-1 is the Polar coordinate system, which uses azimuth, elevation and distance parameters as defined in Table 14 of ITU-R BS.2076-1, which is reproduced below:

TABLE 14 audioBlockFormat sub-elements for Objects (polar)

| Sub-element | Attribute | Description | Units | Example | Quantity | Default |
| --- | --- | --- | --- | --- | --- | --- |
| position | coordinate = "azimuth" | azimuth "theta" of sound location | Degrees ($-180 \leq$ theta $\leq 180$) | −22.5 | 1 | |
| position | coordinate = "elevation" | elevation "phi" of sound location | Degrees ($-90 \leq$ phi $\leq 90$) | 5.0 | 1 | |
| position | coordinate = "distance" | distance "r" from origin | abs(r) | 0.9 | 0 or 1 | 1.0 |
| width | | horizontal extent | Degrees | 45 | 0 or 1 | 0.0 |
| height | | vertical extent | Degrees | 20 | 0 or 1 | 0.0 |
| depth | | distance extent | Ratio | 0.2 | 0 or 1 | 0.0 |

Alternatively, it is possible to specify the position of an audio object in the Cartesian coordinate system. For a Cartesian coordinate system, the position values (X, Y and Z) and the size values are normalized to a cube:

TABLE 15 audioBlockFormat sub-elements for Objects (Cartesian)

| Sub-element | Attribute | Description | Units | Example | Quantity | Default |
|---|---|---|---|---|---|---|
| position | coordinate = "X" | left/right dimension | Normalized Units | −0.2 | 1 | |
| position | coordinate = "Y" | back/front dimension | Normalized Units | 0.1 | 1 | |
| position | coordinate = "Z" | bottom/top dimension | Normalized Units | −0.5 | 0 or 1 | 0.0 |
| width | | X-width | Normalized Units | 0.03 | 0 or 1 | 0.0 |
| depth | | Y-width | Normalized Units | 0.05 | 0 or 1 | 0.0 |
| height | | Z-width | Normalized Units | 0.07 | 0 or 1 | 0.0 |

A sample XML code which illustrates the position coordinates (x,y,z) is given in section 5.4.3.3.1 of ITU-R BS.2076-1 by <audioBlockFormat . . . >
<position coordinate="azimuth">−22.5</position>
<position coordinate="elevation">−5.0</position>
<position coordinate="distance">−0.9</position>
<depth>0.2</depth>
</audioBlockFormat>

Based on the description of ITU-R BS.2076-1 audio definition model described above in more detail, the coordinate extraction process described with regard to FIG. 3 above (see reference sign 19 in FIG. 3) may for example be realized by reading these coordinate attributes (x, y, z) or (azimuth, elevation, distance) from the position sub-element of an audioBlockFormat definition included in the metadata of the audio object stream. The set of positions of audio objects obtained in this way defines a field of listening, which is evaluated in order to determine a position distraction level as described in more details below.

Figure 4:
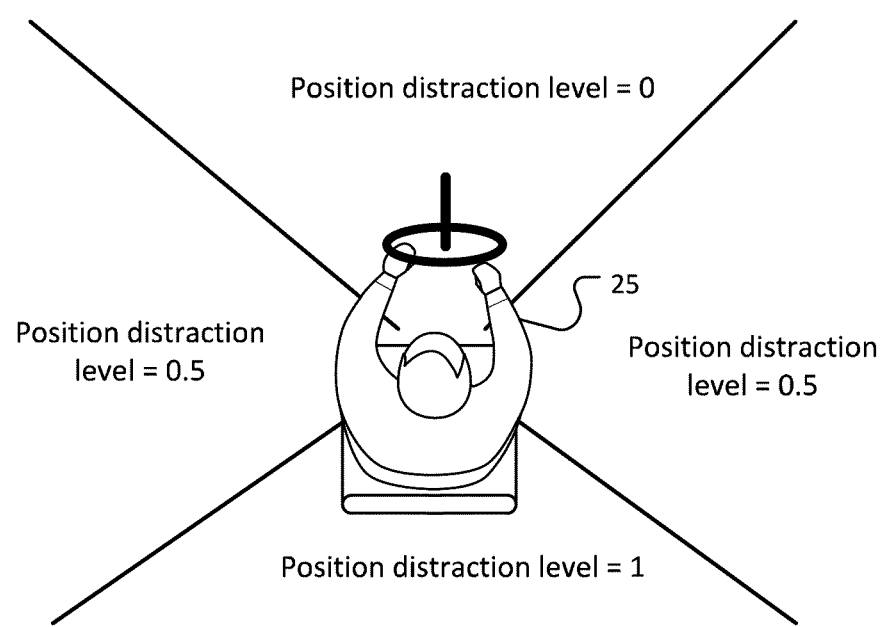
FIG. 4 visualizes how position distraction level of an audio object stream is related to the position of a driver in an in-vehicle-scenario.

FIG. 4 visualizes how the position distraction level of an audio object stream is related to the position of a driver in an in-vehicle-scenario. A field of listening of the driver 25 is divided into four regions, which are related with the position of the driver 25. Each one of the four regions, here $R_{front}$, $R_{left}$, $R_{right}$, and $R_{rear}$, is associated with a predetermined position distraction level, here the field of view without head turn ($R_{front}$), the field of view after a right head turn ($R_{right}$), the field of view after a left head turn ($R_{left}$) and the field of view otherwise ($R_{rear}$), for example, after a 100° head turn. The position distraction level is equal to 0, when the driver 25 is looking straight to the direction of the vehicle without turning his head, e.g. looking in the front. The position distraction level is equal to 0.5, when the driver 25 is turning his head right/left, for example, after a 90° head turn, and the position distraction level=1, otherwise. Thus, as described, inside the field of view of the driver 25 without head turn, the distraction level is small and otherwise is large.

The relationship between the position distraction level and the regions in the field of listening, being associated with the position of the driver 25, is given by $$d(x, y, z)_i = \begin{cases} 0 & \text{if } (x, y, z)_i \in R_{front} \\ 0.5 & \text{if } (x, y, z)_i \in R_{left} \text{ or } (x, y, z)_i \in R_{right} \\ 1 & \text{if } (x, y, z)_i \in R_{rear} \end{cases}$$

where $R_{front}$, $R_{left}$, $R_{right}$, and $R_{rear}$ are the regions in the field of listening.

As described in FIG. 3 above, the coordinates (x, y, z) 20 of the audio object represent a position of the audio object, and thus, a field of listening. A distraction level of a field of listening is computed by summing the position distraction level of an audio object over all audio objects in an audio object stream. The distraction level of the field of listening obtained by the field of listening evaluation 10 is given by $$D = \sum_{i \in \mathbb{S}} d(x, y, z)_i$$

where $\mathbb{S}$ is a set of all audio objects in an audio stream which define the field of listening, $(x, y, z)_i$ is the position of an audio object i, $d(x, y, z)_i$ is the distraction level of an audio object i, and D is the position distraction level of field of listening. This position distraction level D is then evaluated decision tree (5 in FIG. 2b) to obtain a list of actions which modify the audio object stream such that it is less distracting with respect to the field of the listening, as it is described in more detail with regard to FIGS. 11a and 11b below.

In addition, or alternatively to the position distraction level (see 10 in FIG. 2a, or 2b) described above in more detail, an aural distraction level (see 11 in FIG. 2a, or 2b) may be determined as described in FIG. 2a, or 2b above.

Additionally, all distraction levels, such as position distraction level (see 10 in FIG. 2a, or 2b), aural distraction level (see 11 in FIG. 2a, or 2b) and the like, are computed for a single audio stream and the action that is taken influence one audio object. For example, a song includes many audio objects, however, nor all of them are distracting. Only a few may be distracting and only these may be altered based on the list of actions to obtain the modified audio stream.

Figure 5A:
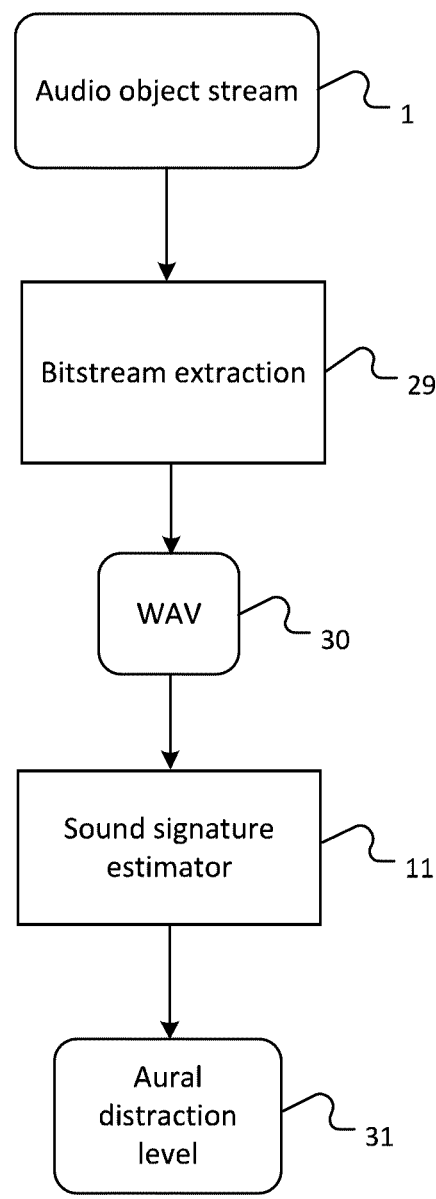
FIG. 5a schematically describes in more detail an embodiment of a sound signature estimation as performed in the process of distraction minimization in an audio object stream described in FIGS. 2a and 2b.

FIG. 5a schematically describes in more detail an embodiment of a sound signature estimation as performed in the process of distraction minimization in an audio object stream described in FIGS. 2a and 2b above. An audio object stream 1 is analyzed by a bitstream extraction 29 to obtain a WAV, such as an audio bitstream 30 (encoded according to e.g. the Waveform Audio File Format, WAV). The audio bitstream 30 represents spectral and temporal characteristics of an audio object e.g. of an audio monopole, in the audio object stream 1. Based on the audio bitstream 30 of the audio object stream 1, the sound signature estimator 11 estimates an aural distraction level 31 related to the audio bitstream.

The sound signature estimator 11 determines characteristics of the audio bitstream which have an influence on the distraction level the sound encoded in the audio bitstream exerts on a driver. It may for example output a high value of the aural distraction level for abrupt spectral/dynamic changes (e.g., impulsive sounds) or for voices/human speech based on the estimated aural distraction level 31. There are several possibilities for realizing a sound signature estimation of a waveform x(n) encoded by the audio bitstream of length N, for example using a transient detector, an energy detector, a neural-network detector, and the like.

In the case of a transient detector, transients, which are portions of audio signals that evolve fast and unpredictably over a short time period, are detected. A quantity that describes transients may for example be obtained by comparing characteristics of an audio signal such as short-term energy and long-term energy.

For example, performing a transient detection may comprise a computation of a ratio $\tau_1$ between short-term energy and long-term energy according to:

$$\tau_1 = \frac{\frac{1}{2M_1+1}\sum_{m=-M_1}^{M_1} x(n+m)^2}{\frac{1}{2M_2+1}\sum_{m=-M_2}^{M_2} x(n+m)^2}$$

where x(n) is the audio signal encoded in the audio bitstream, $[-M_1, M_1]$ is a first time window in which the short-time energy is calculated and $[-M_2, M_2]$ is a second time window in which the longtime energy is calculated, with $M_1 < M_2$, and where m is an index which runs over the audio samples in the respective time windows in which the long-time energy and the short-time energy is calculated.

A transient may for example be detected if this ratio $\tau_1$ is large which may result in distractions ("impulsive sound") being caused by the audio signal to which the calculated ratio is related. Determining whether or not the ratio $\tau_1$ is large may for example be realized by comparing the ratio $\tau_1$ with a predefined threshold value $\gamma$. For example, $\tau_1 \geq \gamma$ yields an aural distraction level of "1.0" whereas $\tau_1 < \gamma$ yields an aural distraction level of "0.0". A possible value for $\gamma$ is $\gamma = 4.0$. As an alternative to comparing $\tau_1$ with a threshold value, one could also use the ratio $\tau_1$ itself as measure of the distraction level. For example, one can use $\tau_1$ itself as a soft value that describes the transient level. In order to have a value in the range 0 to 1, a squashing function like the 'tanh' function may be used which maps the value range [0, ∞] to [0,1].

As stated above, there are other possibilities for realizing a sound signature estimation of a waveform x(n) encoded by the audio bitstream of length N. In addition, or as an alternative to the transient detector described above, also an energy detector may be used for performing a sound signature estimation.

An energy detector may for example be realized by determining the normalized energy $$\tau_2 = \frac{1}{N}\sum_{n=1}^{N} x(n)^2,$$

which is used as distraction level (high energy ($\tau_2 \approx 1$) means a lot of distraction).

In addition, or alternatively, a Neural-network detector may be realized by collecting, as a first step, human labels for the perceived distraction of sounds (on a scale from 0 to 1). A neural network DNN is then trained based on this collected data, such that a distraction level to be estimated based on previously unseen waveforms. I.e., the neural network DNN maps samples x(1), . . . , x(N) of an audio window of length N onto a distraction level $\tau_3$:

$$\tau_3 = DNN\{x(1), \ldots, x(N)\}.$$

As stated above, the audio bitstream 30 represents spectral and temporal characteristics of an audio object e.g. of an audio monopole, in the audio object stream 1. Based on the audio bitstream 30 of the audio object stream 1, the sound signature estimator 11 estimates an aural distraction level 31 related to the audio bitstream.

The spectral characteristics of the audio bitstream may for example be obtained by computing a discrete Fourier transformation of each audio window of an audio object stream. That is, each audio window is converted into a respective short-term power spectrum $P_f(n)$ using the Fourier transformation, also known as power spectral density, may be obtained by $$P_f(n) = \left|\sum_{i=0}^{N-1} X_n(i) e^{-\frac{j2\pi fi}{N}}\right|$$

where $X_n(i)$ is the signal in each audio window $X_n$ of an audio object stream, f are the frequencies in the frequency domain, $P_f(n)$ are the components of the short-term power spectrum P(n) and N is the numbers of samples in an audio window $X_n$.

The signal in each audio window X, of an audio object stream can be obtained by $$X_n(i) = x(n+i)h(i)$$

where x(n+i) represents the discretized audio object signal (i representing the sample number and thus time) shifted by n samples. h(i) is a windowing function around time n (respectively sample n), like for example the hamming function, which is well-known to the skilled person.

For example, a spectral flatness detection may be used in the sound signature estimation 11 of FIG. 5a to detect noise based on the power spectrum $P_f(n)$. Existing noise in an audio object stream may be distracting for the driver. The sound signature estimation 11 may thus estimate the aural distraction level 31 based on a level of noise detected in the audio object stream 1 by the spectral flatness detection. The spectral flatness F may for example be measured in decibels, and may be used here to characterize the audio bitstream of audio object stream 1, and to thus quantify how tone-like a sound is, as opposed to being noise-like.

The spectral flatness F may for example be calculated by dividing the geometric mean of the power spectrum by the arithmetic mean of the power spectrum $P_f(n)$, i.e.:

$$F = \frac{\sqrt[N]{\prod_{f=0}^{N-1} P_f(n)}}{\frac{\sum_{f=0}^{N-1} P_f(n)}{N}} = \frac{\exp\left(\frac{1}{N}\sum_{f=0}^{N-1} \ln P_f(n)\right)}{\frac{1}{N}\sum_{f=0}^{N-1} \ln P_f(n)}$$

where $P_f(n)$ represents the magnitude of bin number n.

A high spectral flatness F (approaching 1.0 for white noise) may indicate that the spectrum has a similar amount of power in all spectral bands—similar to white noise, and the graph of the spectrum would appear relatively flat and smooth. A low spectral flatness F (approaching 0.0 for a pure tone) indicates that the spectral power is concentrated in a relatively small number of bands—like a mixture of sine waves, and the spectrum may appear "spiky", e.g. having many peaks. That is, the spectral flatness F can be directly used to express the aural distraction level 31, the spectral flatness F is high for noise-like signals which are disturbing to the driver. In other words, the spectral flatness detector may "look" in the power spectrum $P_f(n)$ of the audio object stream 1 and to determine whether or not a noise exists and its level. For example, the more noise detected in the audio object stream, the higher the distraction level, here the aural distraction level 31, in FIG. 5a.

The ratio F produced by this calculation may be converted to a decibel scale for reporting, with a maximum of 0 dB and a minimum of −∞ dB. The spectral flatness F may also be measured within a specified sub band, rather than across the whole band. A single (or more) empty bin may result to a flatness F of 0.

Figure 5B:
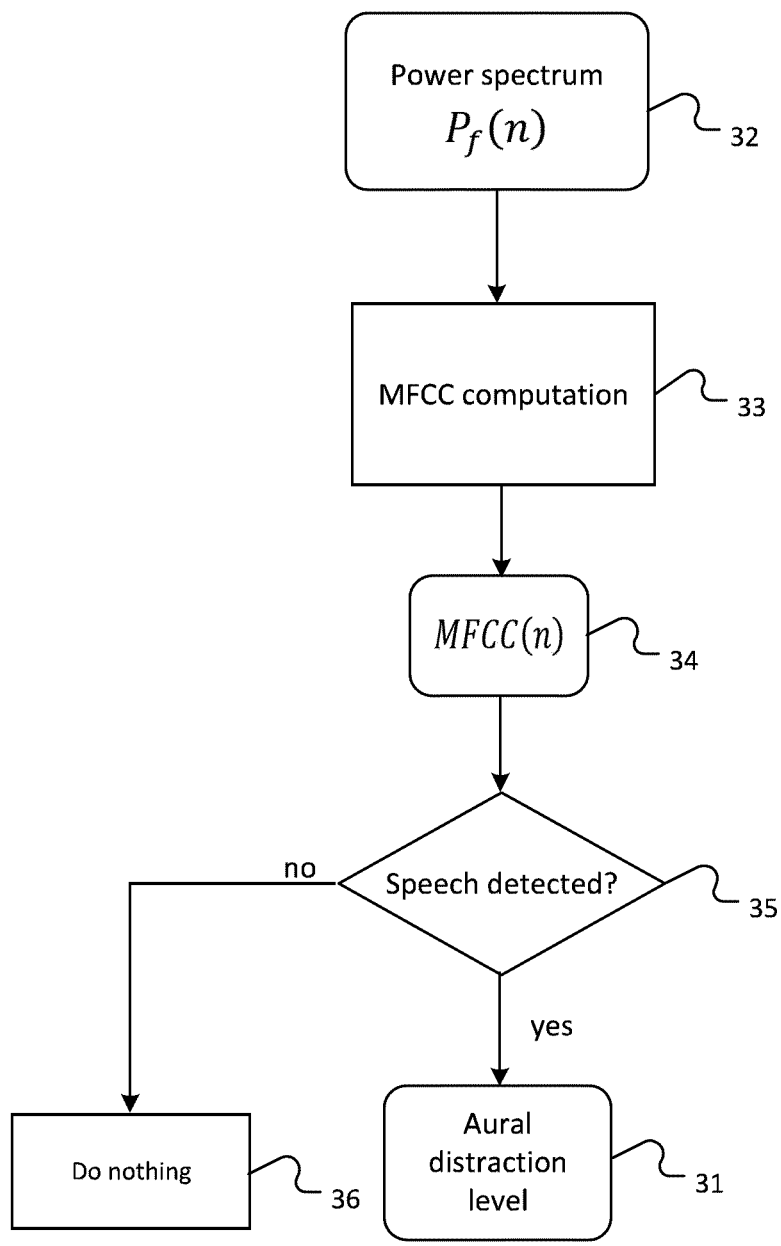
FIG. 5b schematically describes an embodiment of a process for determining a distraction level, such as the aural distraction level 31 of FIG. 5a and the position distraction level 21 of FIG. 3, based on the power spectrum $P_f(n)$.

FIG. 5b schematically describes an embodiment of a process for determining a distraction level, such as the aural distraction level 31 of FIG. 5a and the position distraction level 21 of FIG. 3, based on the power spectrum $P_f(n)$, as computed above under the reference of FIG. 5a.

For example, a voice activity detection may be used in the sound signature estimation 11 of FIG. 5a to detect human speech based on the power spectrum $P_f(n)$ 32. Human speech may be distracting 1s for the driver, depending on the position of a person utters the speech relatively to the position of the driver. The sound signature estimation 11 may thus estimate the aural distraction level 31 based on a speech detection 35 by voice activity detection.

In the present embodiment, the power spectrum $P_f(n)$ 32 of the audio object stream 1 is used to perform MFCC(n) computation 33 to obtain time-varying coefficients, such as Mel-scale filterbank cepstral coefficients MFCC(n) 34 for each audio window. That is, the Mel-scale filterbank cepstral coefficients MFCC(n) may be obtained by $$MFCC(n) = DCT\{\log(M \cdot P(n))\}$$

where P(n) is a vector of $P_f(n)$ values, which is the short-term power spectrum for a windowed frame n (around a respective time instant) as obtained by the Discrete Fourier Transformation, M is a matrix having filters of a Mel-filterbank as rows and DCT is the Discrete Cosine transform matrix.

Subsequently, speech detection may be performed by analyzing the MFCC(n) 34, as also described by Ben Milner and Xu Shao in "*Speech Reconstruction From Mel-Frequency Cepstral Coefficients Using a Source-Filter Model*", wherein, index n, may represent a time scale. The Mel-scale filterbank cepstral coefficients MFCC(n) 34 obtained by this process may represent characteristic feature vectors of the audio object stream 1 in each audio window. If speech detected 35, the aural distraction level 31 is estimated. If speech is not detected, the process ends 36, e.g. "Do nothing".

In the present embodiment, the aural distraction level 31 comprises the position distraction level 21 obtained by the field-of-listening estimation 10 of FIG. 3. The position distraction level 21 is estimated as described under the reference of FIG. 3. Therefore, the aural distraction level 31 including the position distraction level 21 of the recognized human speech is estimated. For example, if the voice is coming, e.g., from behind the driver, as described in FIGS. 3 and 4 above, it is determined that a human speech has a high distortion level, such as high aural distraction level 31 comprising high position distraction level 21, regarding the position distraction level of an audio object. Voice activity detection may be performed in the frequency domain.

In addition, or alternatively to the position distraction level (see 10 in FIG. 2a, or 2b) and the aural distraction level (see 11 in FIG. 2a, or 2b) described above in more detail, also a distance estimation may be performed as described in FIG. 2a, or 2b above (see 12 in FIG. 2a, or 2b).

Figure 6:
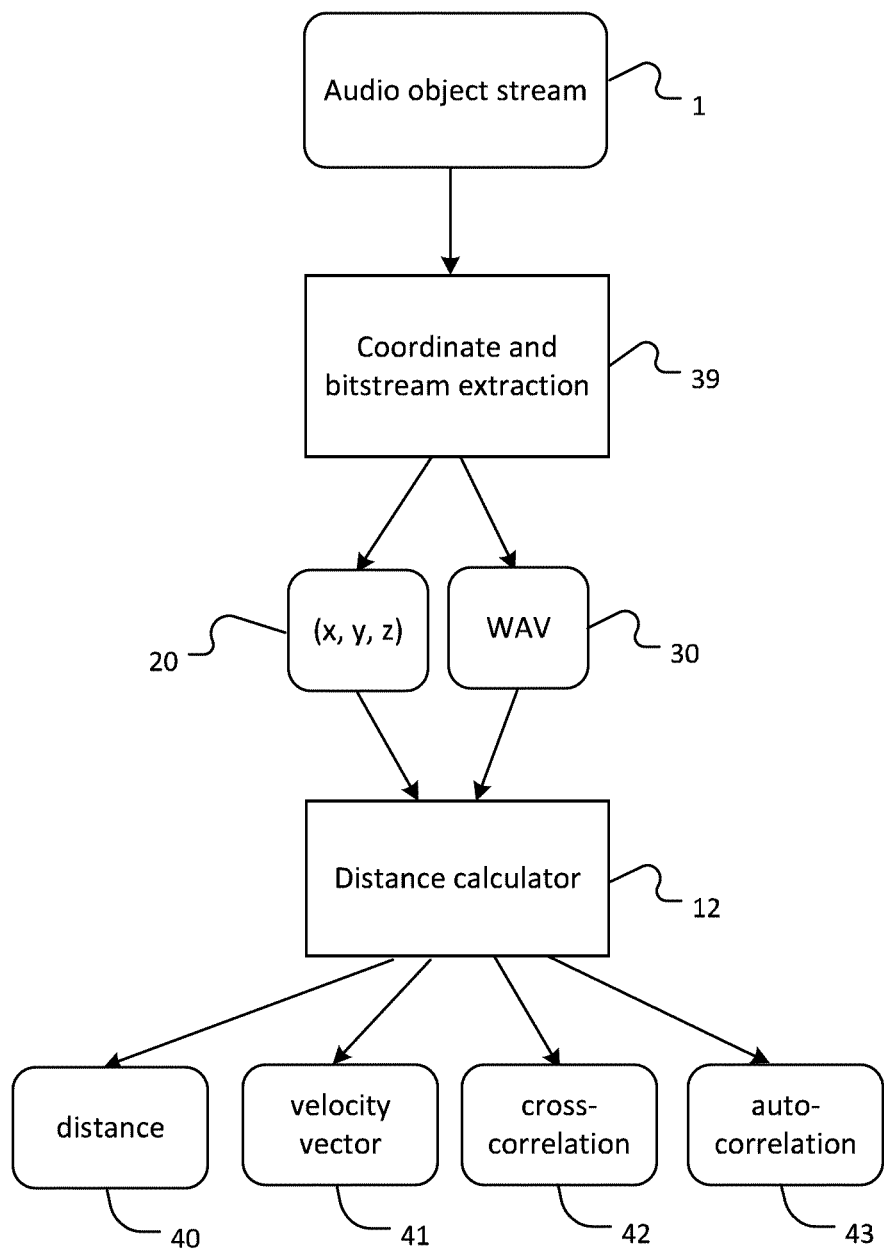
FIG. 6 schematically describes in more detail an embodiment of a distance calculation as performed in the process of distraction minimization in an audio object stream described in FIGS. 2a and 2b.

FIG. 6 schematically describes in more detail an embodiment of a distance calculation as performed in the process of distraction minimization in an audio object stream described in FIGS. 2a and 2b above. An audio object stream 1 is analyzed by a coordinate and bitstream extraction 39 to obtain coordinates (x, y, z) 20 of audio objects, such as for example monopoles, together with an audio bitstream 30 (encoded according to e.g. the Waveform Audio File Format, WAV), which represents spectral and temporal characteristics of the audio object in the audio object stream 1. Based on the coordinates (x, y, z) and the bitstream (waveform), a distance calculator 12 estimates a perceived distance 40, a perceived velocity vector 41, a cross-correlation 42, and an auto-correlation 43 related to the audio bitstream.

In the present embodiment, the distance calculator 12 determines a distance estimation, and thus, a distance distraction level is estimated based on the distance estimation.

For example, in an in-vehicle scenario, the perceived distance 40 is the distance between a position of a driver (x, y, Z)$_{driver}$ and a position of an audio object (x, y, Z)$_{audio}$ of the audio object stream. The position of the driver (x, y, Z)$_{driver}$ may be detected by in-vehicle sensors, for example, by a sensor array that comprises a plurality of sensors, each one arranged at a respective seat of the vehicle. The plurality of sensors may be any kind of sensors such as a pressure sensor capable of obtaining a respective presence of passengers/driver at the front and rear seats of the vehicle. The position of the audio objects (x, y, Z)$_{audio}$ is estimated by the extracted coordinates (x, y, z) as described in more detail in the embodiments of FIGS. 3 and 6 above. The perceived distance 40 is calculated by computing the difference between the position of the driver (x, y, Z)$_{driver}$ and the position of the audio objects (x, y, z)$_{audio}$, given by $$d = |\vec{r}| = |(x,y,Z)_{audio} - (X,Y,Z)_{driver}|$$

In addition, the perceived velocity vector 41 is calculated by computing the derivative of the position, here the perceived distance 40, with respect to time:

$$\vec{v} = \frac{d}{dt}\vec{r} = \frac{d}{dt}[(x, y, z)_{audio} - (x, y, z)_{driver}]$$

Additionally, the cross-correlation 42 may be calculated by an inter-object cross-correlation coefficient (IOCC) as follows $$IOCC(\tau) = \frac{\int_{-\infty}^{+\infty} s_i(t-\tau)s_j(\tau)dt}{\sqrt{\int_{-\infty}^{+\infty} s_i^2 dt \int_{-\infty}^{+\infty} s_j^2 dt}}$$

where $s_i(t), s_j(t)$ are the audio object signal of the audio bitstream.

The normalized cross-correlation function is bounded between −1 and +1, wherein a cross-correlation coefficient of +1 indicates that $s_i(t)$, $s_j(t)$ are coherent, e.g. identical, signals, a cross-correlation coefficient of −1 indicates that $s_i(t)$, $s_j(t)$ are coherent, e.g. identical, signals, with a phase shift of 180°, and a cross-correlation coefficient of 0 indicates that $s_i(t)$, $s_j(t)$ are incoherent signals. Intermediate values may indicate partial coherence or incoherence between the $s_i(t)$, $s_j(t)$ signals.

Optionally, in order to compute the perceived distance, the reverb level (intra-channel) may be estimated based on an inter-channel correlation. The inter-channel correlation as computed above may be used to see whether audio objects are correlated. In an audio object stream, one "source" like the vocals may be represented by several audio objects, where one audio object represents the direct path and the other audio objects represent the reflections. Thus, it is possible to determine the perceived distance of the audio object.

Figure 7:
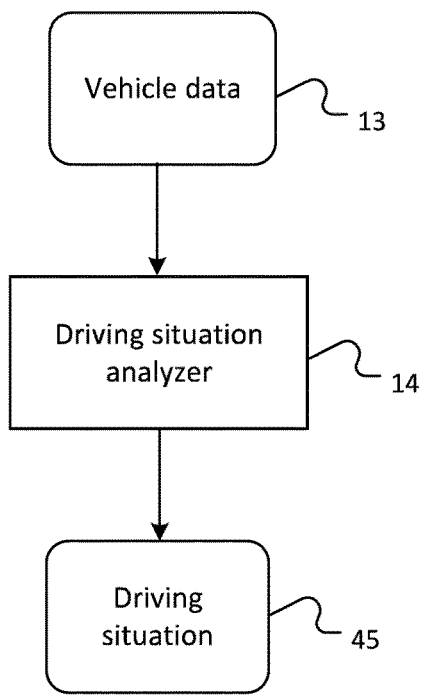
FIG. 7 schematically describes in more detail an embodiment of a process of a driving situation analyzer as performed in the process of distraction minimization in an audio object stream described in FIG. 2b.

FIG. 7 schematically describes in more detail an embodiment of a process of a driving situation analyzer as performed in the process of distraction minimization in an audio object stream described in FIG. 2b above. Based on vehicle data 13, a driving situation analyzer 14 analyzes the vehicle data 13 to obtain a driving situation 45. The driving situation analyzer 14 estimates the criticalness of the current driving situation 45 by considering different kind of vehicle data, such as time of day, driving speed, other driving related parameters and the like. In the present embodiment, a driving distraction level is estimated based on the driving situation (45).

The vehicle data 13 are collected for example, from a cloud regarding traffic situation, traffic lights and the like, or acquired for example by vehicle sensors, inside and outside the vehicle, such as Time-of-Flight sensors, ultrasonic sensors, radar device and the like. The vehicle data 13 may be stored in a database and collected from the database.

Figure 8:
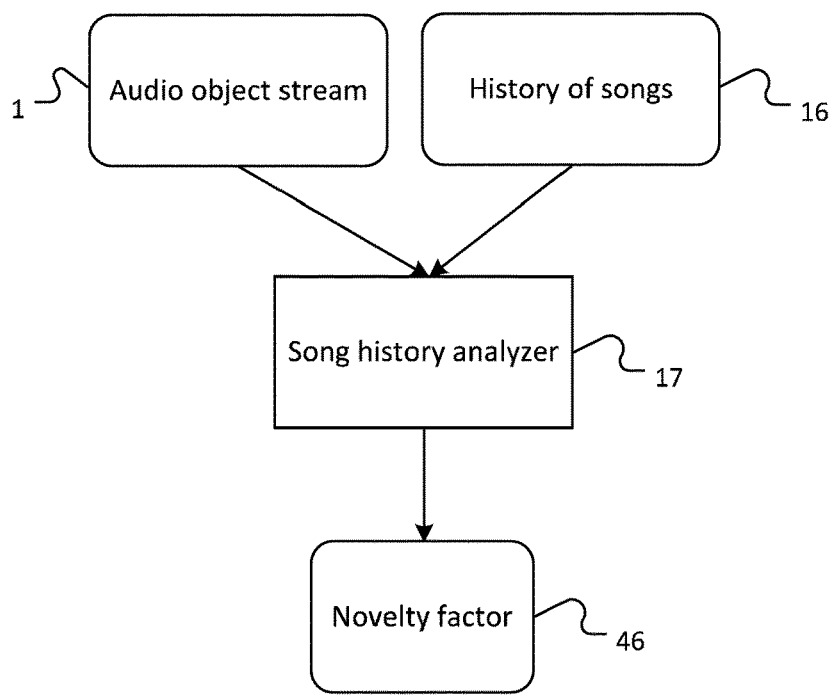
FIG. 8 schematically describes in more detail an embodiment of a process of novelty factor estimation as performed in the process of distraction minimization in an audio object stream described in FIG. 2b.

FIG. 8 schematically describes in more detail an embodiment of a process of novelty factor estimation as performed in the process of distraction minimization in an audio object stream described in FIG. 2b above. Based on a history of songs 16 and an audio object stream 1, a song history analyzer 17 estimates a novelty factor 46. The novelty factor, which is related to the audio object stream 1, is estimated based on a history of songs 16, e.g. by comparing the audio object stream 1 and the history of songs 16 stored in a database, for example a user's playlist. The novelty factor 46 expresses how familiar a driver is with an audio material, such as a song that is played-back, and that user's distraction is higher for a new audio material than for an already known audio material. Determining whether or not the audio object stream is new may for example be realized by comparing the novelty factor 46 with a predefined threshold value, for example with a value 0.5. In the present embodiment, a novelty distraction level is estimated based on the novelty factor (46).

Figure 9:
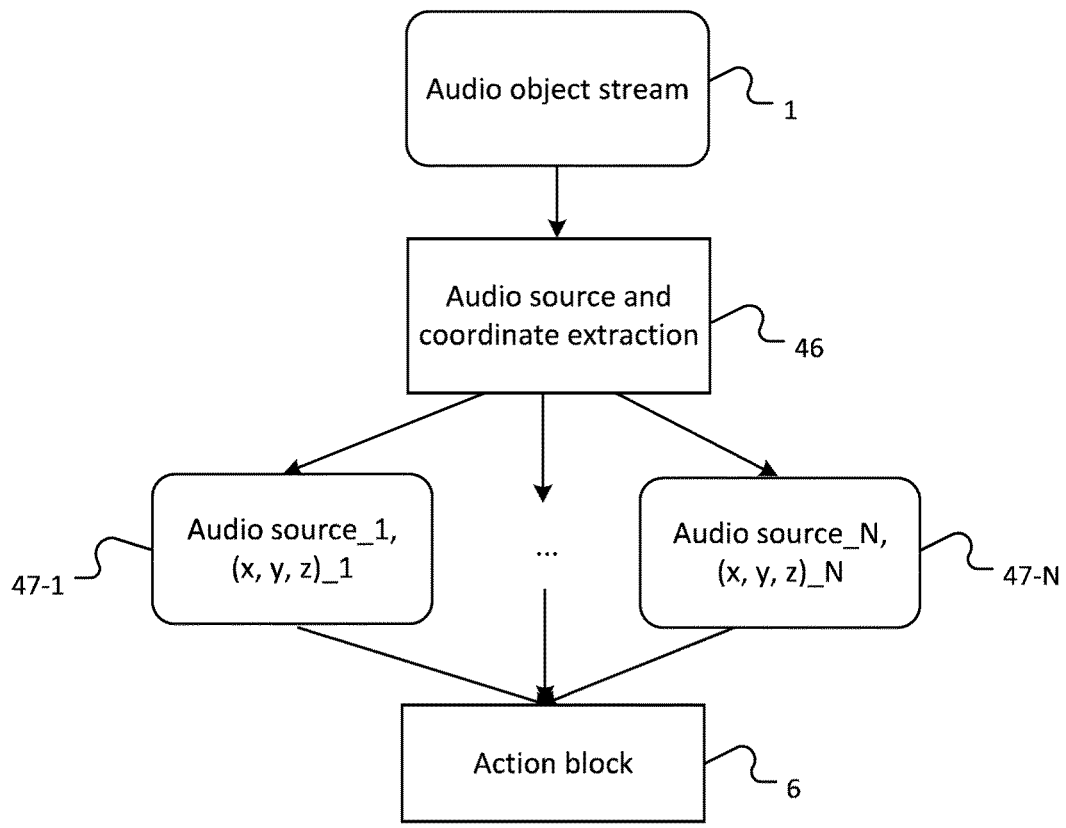
FIG. 9 schematically describes in more detail an embodiment of a process of audio source and coordinate extraction as performed in the process of distraction minimization in an audio object stream.

FIG. 9 schematically describes in more detail an embodiment of a process of audio source and coordinate extraction as performed in the process of distraction minimization in an audio object stream. Based on an audio object stream 1, an audio source and coordinate extraction 46 obtains audio sources 1, . . . , N and coordinates $(x, y, z)_{1, \ldots, N}$ of the audio objects in the audio object stream 1. Each one of the audio sources 1, . . . , N and coordinates $(x, y, z)_{1, \ldots, N}$, here audio source_1, $(x, y, z)_1$ 47-1, . . . , audio source_1, $(x, y, Z)_N$ 47-N are input to an action block 6.

Figure 10:
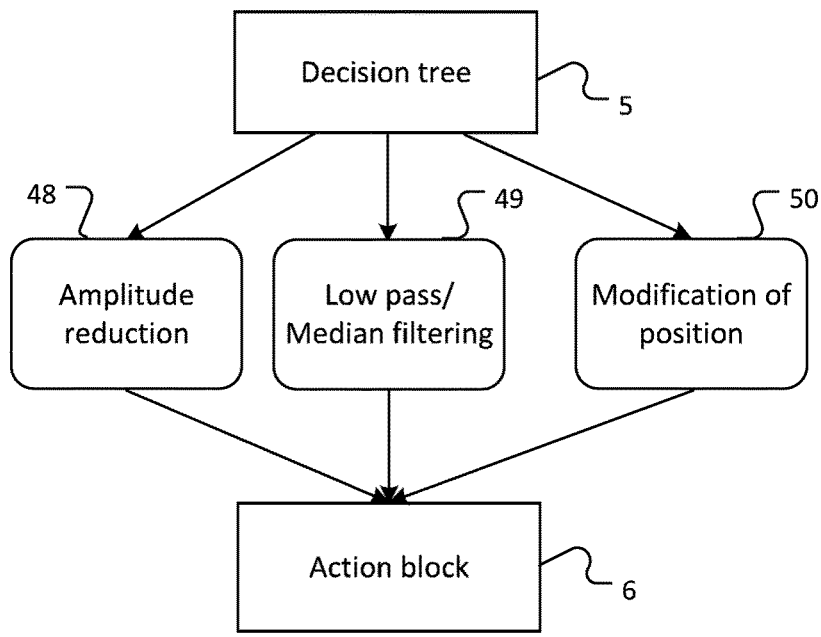
FIG. 10 schematically describes in more detail an embodiment of determining a list of actions by a decision tree as performed in the process of distraction minimization in an audio object stream described in FIGS. 2a and 2b.

FIG. 10 schematically describes in more detail an embodiment of determining a list of actions by a decision tree as performed in the process of distraction minimization in an audio object stream described in FIGS. 2a and 2b above. A decision tree 5 determines a list of actions, such as countermeasures, here an amplitude reduction 48 of the audio-object, a low-pass/median filtering 49 or any other kind of filter, which reduces the harshness of a sound, and a modification of position 50. The list of actions is input in an action block 6. In the present embodiment, the list of actions contains three actions, without limiting the scope of protection in that regard. The list of actions may contain any number of actions, less, equal, or more than three actions. The list of actions may contain any number of actions, for example, the list of actions may contain one action or more than one actions. Additionally, the list of actions may be applied to one or any number of audio objects in the stream.

As mentioned in FIGS. 2a and 2b, also based on the estimated distraction levels (see also FIGS. 3, 5a and 6), the driving situation criticalness (see also FIG. 7) and the novelty factor (see also FIG. 8), the decision tree 5 determines as a final decision, the list of actions. The list of actions is used to alter the playback of the audio-object stream. In addition, during the modification of position 50, the (x, y, z) coordinates of the audio-object are altered. For example, all sources which are outside of the field of view are warped to the front, which reduces the perceived distraction.

As described, in the present embodiment an amplitude reduction 48 of the audio-object is performed. Alternatively, abrupt dynamic changes are smoothened by slowly blending between different amplitudes.

Figure 11A:
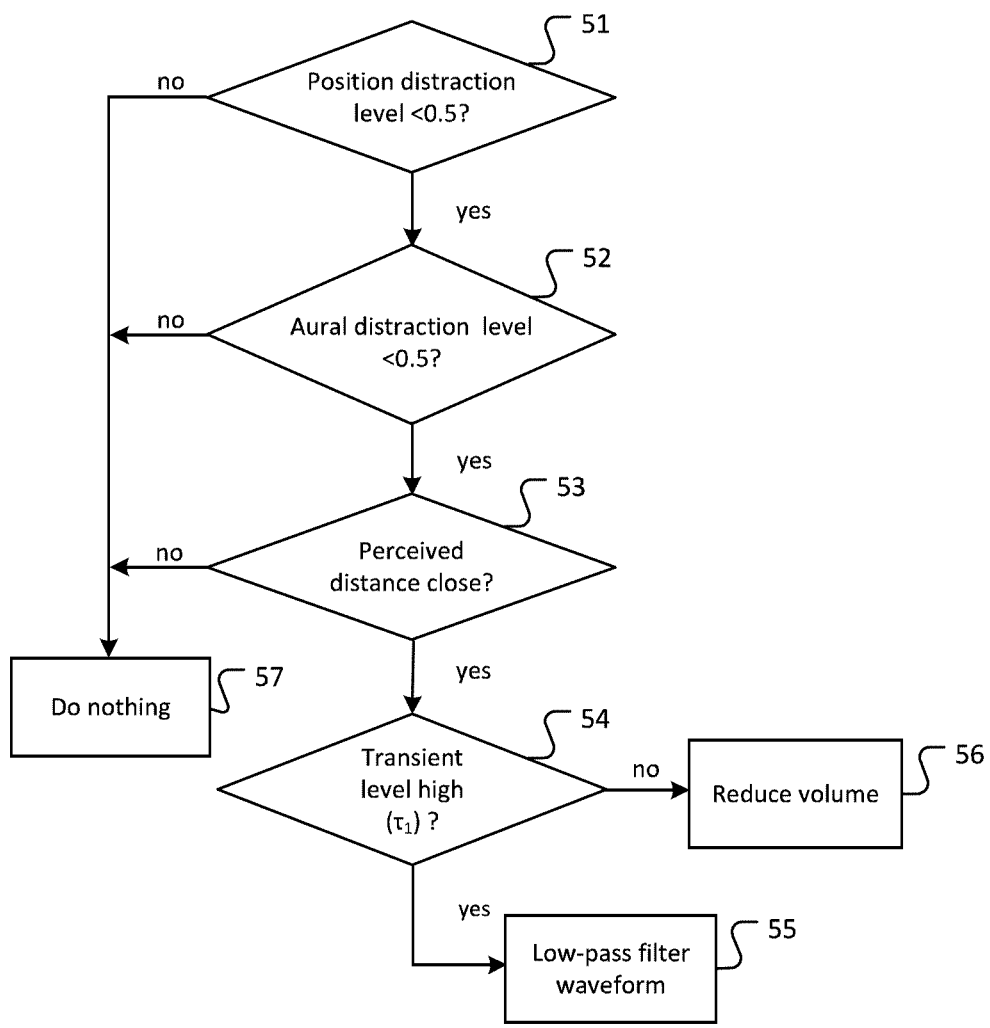
FIG. 11a illustrates a process of the embodiment described in FIG. 2a, implemented by a decision tree and an action block.

FIG. 11a illustrates a process of the embodiment described in FIG. 2a, implemented by a decision tree and an action block. In this implementation, a decision tree 5 determines a list of actions by merging different distraction levels and inputting the list of actions to an action block 6. In the present embodiment, an audio object stream is analyzed, and, at 51, a position distraction level is estimated (see FIG. 3). If the position distraction level is less than 0.5, the method proceeds at 52. If the position distraction level is more than 0.5, the method proceeds at 57. At 52, an aural distraction level is estimated (see FIG. 5a). If the aural distraction level is less than 0.5, the method proceeds at 53. If the aural distraction level is more than 0.5, the method proceeds at 57. At 53, a perceived distance is estimated based on distance calculation (see FIG. 6). If the perceived distance is small (here "close?"), for example if the source is inside the car, the method proceeds at 54. If the perceived distance is not small, for example if the source is outside the car, the method proceeds at 57. At 54, a transient level $\tau_1$ is computed. If the transient level $\tau_1$ is high, for example, if $\tau_1=4$, the method proceeds at 55. If the transient level $\tau_1$ is not high, the method proceeds at 56 (see ratio $\tau_1$ in the description of FIG. 5a). At 55, a low-pass filtering (see 49 in FIG. 10) is performed based on a low-pass filter waveform, which reduces the harshness of a sound. At 56, the volume is reduced, for example, by reducing the amplitude of the audio-object (see 48 in FIG. 10). At 57, the method ends, e.g. "Do nothing".

In the present embodiment, if the transient level $\tau_1$ is not high, the list of actions, obtained for each set of distraction levels, here position distraction level, aural distraction level, and distraction level based on distance estimation, is one list of actions which contains one action, here volume reduction performed at 56. Also, if the transient level $\tau_1$ is high, the list of actions, obtained for each set of distraction levels, here position distraction level, aural distraction level, and distraction level based on distance estimation, is one list of actions which contains one action, here low-pass filtering performed at 55. Alternatively, the list of actions, obtained for each set of distraction levels, is one list of actions which may contain any number of actions, for example, the list of actions may contain one action or more than one actions.

In the present embodiment, in the case where the computed transient level $\tau_1$ is not high, the volume of the audio object stream is reduced, for example, by scaling the sample by a predetermined value. If the predetermined value, which is a gain factor, is, for example, G, then the modified audio object stream is given by $$x'(n)=G*x(n)$$

where x'(n) is the modified audio object stream, x(n) is the audio object stream, and G is the scaling factor.

For example, if the predetermined value, which is the gain factor, is G=0.5, the volume of the audio object stream is reduced by 6 dB, and if the gain factor is G=0.25, the volume of the audio object stream is reduced by 12 dB. The above described values of the gain factor are exemplary values, without limiting the scope of protection in that regard.

In the present embodiment, in the case where the computed transient level $\tau_1$ is high, a low-pass filtering is performed to reduce the harshness of a sound. That is, a filter that passes signals with a frequency lower than a selected cutoff frequency and eliminates all frequencies above the cutoff frequency. Determining which frequency is the low-pass filter threshold may for example be realized by comparing the frequency with a predefined threshold value, for example the threshold value may be a cut-off frequency $f_c$=4 kHz, without limiting the scope of protection in that regard.

The low-pass filter is given by $$\frac{x'(n)}{x(n)} = \frac{A_F}{\sqrt{\left(1+\left(\frac{f}{f_c}\right)^2\right)}}$$

where x'(n) is the modified audio object stream, x(n) is the audio object stream, $A_F$ is the passband gain of the filter, f is the frequency of the audio object stream x(n), and f is the cut-off frequency. For example, $A_F$ may be $A_F$=1, in order to have a gain of 0 dB for f=0Hz.

In other words, low-pass filter has a gain $A_F$ at DC from 0 Hz to the high-cut-off frequency limit $f_c$. After $f_c$, the gain $A_F$ decreases constantly with increasing frequency.

Active low-pass filters are used in audio amplifiers, equalizers or speaker systems to direct the lowfrequency bass signals to the larger bass speakers or to reduce high-frequency interference or distortion.

Figure 11B:
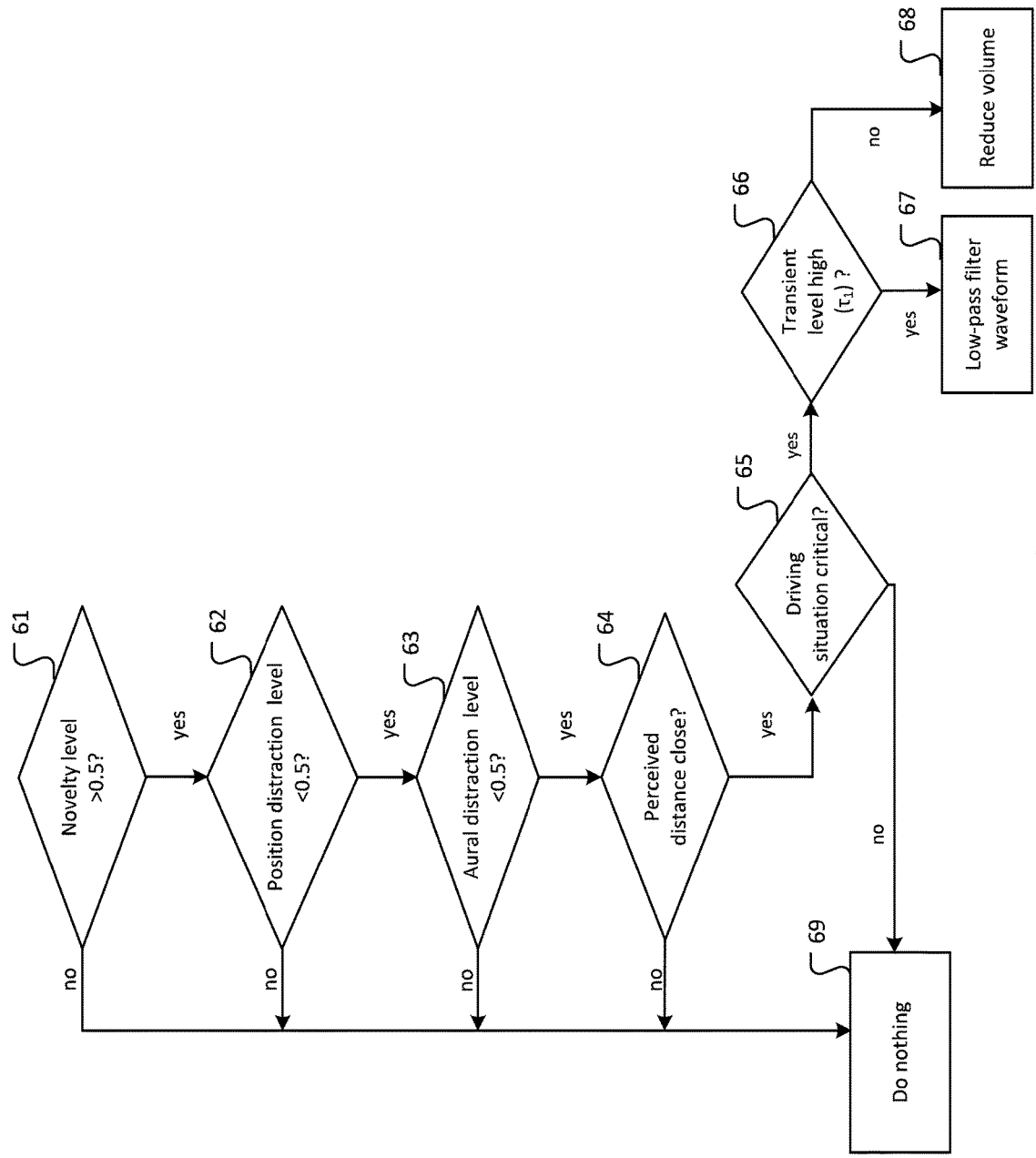
FIG. 11b illustrates a process of the embodiment described in FIG. 2b, implemented by a decision tree and an action block.

FIG. 11b illustrates a process of the embodiment described in FIG. 2b, implemented by a decision tree and an action block. In this implementation, a decision tree 5 determines a list of actions by merging different distraction levels, a novelty factor and an estimation of a driving situation. In the present embodiment, a history of songs is analyzed, and, at 61, a novelty level is estimated (see novelty factor in FIG. 8). If the novelty level is more than 0.5, the method proceeds at 62. If the novelty level is less than 0.5, the method proceeds at 69. At 62, a position distraction level is estimated (see FIG. 3). If the position distraction level is less than 0.5, the method proceeds at 63. If the position distraction level is more than 0.5, the method proceeds at 69. At 63, an aural distraction level is estimated (see FIG. 5a). If the aural distraction level is less than 0.5, the method proceeds at 64. If the aural distraction level is more than 0.5, the method proceeds at 69. At 64, a perceived distance is estimated based on distance calculation (see FIG. 6). If the perceived distance is small (here "close?"), the method proceeds at 65. If the perceived distance is large, the method proceeds at 59. At 65, the driving situation is estimated (see FIG. 7). If the driving situation is critical, the method proceeds at 66. If the driving situation is not critical, the method proceeds at 69. At 66, a transient level is computed (see ratio $\tau_1$ in the description of FIG. 5a). If the transient level $\tau_1$ is high, the method proceeds at 67. If the transient level $\tau_1$ is not high, the method proceeds at 68. At 67, a low-pass filtering (see 49 in FIG. 10) is performed based on a low-pass filter waveform, which reduces the harshness of a sound. At 68, the volume is reduced by reducing the amplitude of the audio-object (see 48 in FIG. 10). At 69, the method ends, e.g. "Do nothing".

In the present embodiment, if the transient level $\tau_1$ is not high, the list of actions, obtained for each set of distraction levels, here novelty level, criticalness of driving situation, position distraction level, aural distraction level, and distraction level based on distance estimation, is one list of actions which contains one action, here volume reduction performed at 68. Also, if the transient level $\tau$, is high, the list of actions, obtained for each set of distraction levels, here novelty level, criticalness of driving situation, position distraction level, aural distraction level, and distraction level based on distance estimation, is one list of actions which contains one action, here low-pass filtering performed at 67. Alternatively, the list of actions, obtained for each set of distraction levels, is one list of actions which may contain any number of actions, for example, the list of actions may contain one action or more than one actions.

Figure 12A:
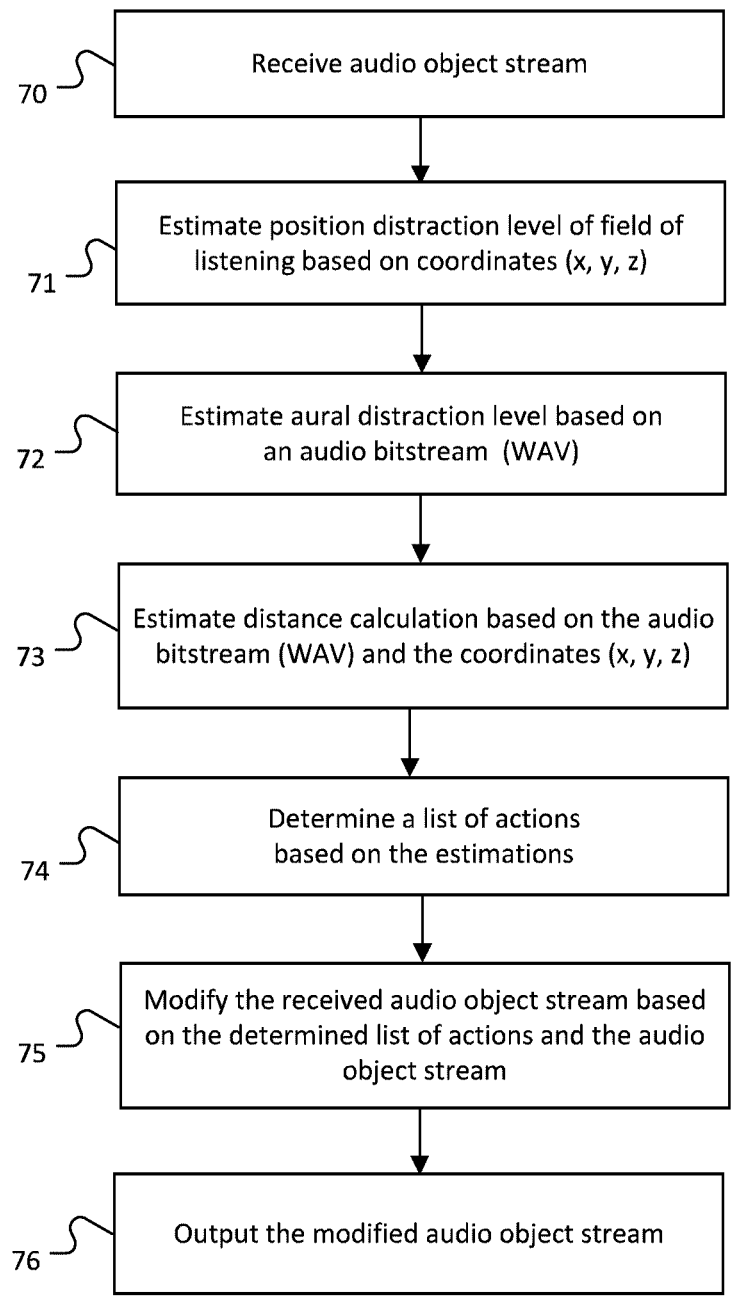

FIG. 12a shows a flow diagram visualizing an exemplary method for performing audio stream modification as described in FIG. 2a.

At 70, an audio object stream (see 1 in FIG. 2a) is received and at 71, a field of listening evaluation (see 10 in FIGS. 2a and 3) is performed on the received audio object stream based on coordinates (x, y, z) of audio objects to estimate a position distraction level (see 21 in FIGS. 2a and 3). At 72, a sound signature estimation (see 11 in FIGS. 2a and 5a) is performed on the audio object stream based on an audio bitstream (see 30 in FIG. 5a) of the audio object stream to estimate an aural distraction level (see 31 in FIG. 5a) related to the audio bitstream. At 73, a distance calculation (see 12 in FIGS. 2a and 6) is performed on the audio object stream based on coordinates (x, y, z) of audio objects and on an audio bitstream to obtain a distance estimation (see 40, 41, 42, 43 in FIG. 6). At 74, a list of actions is determined by a decision tree (see 5 in FIG. 2a) based on input estimations, such as the estimated position distraction level, the estimated aural distraction level, and/or the distance estimation. At 75, the received audio object stream is modified by an action block (see 6 in FIG. 2a) based on the determined list of actions and the audio object stream. At 76, the modified audio object stream is output, for example to a loudspeaker array of a vehicle, in an in-vehicle scenario.

Figure 12B:
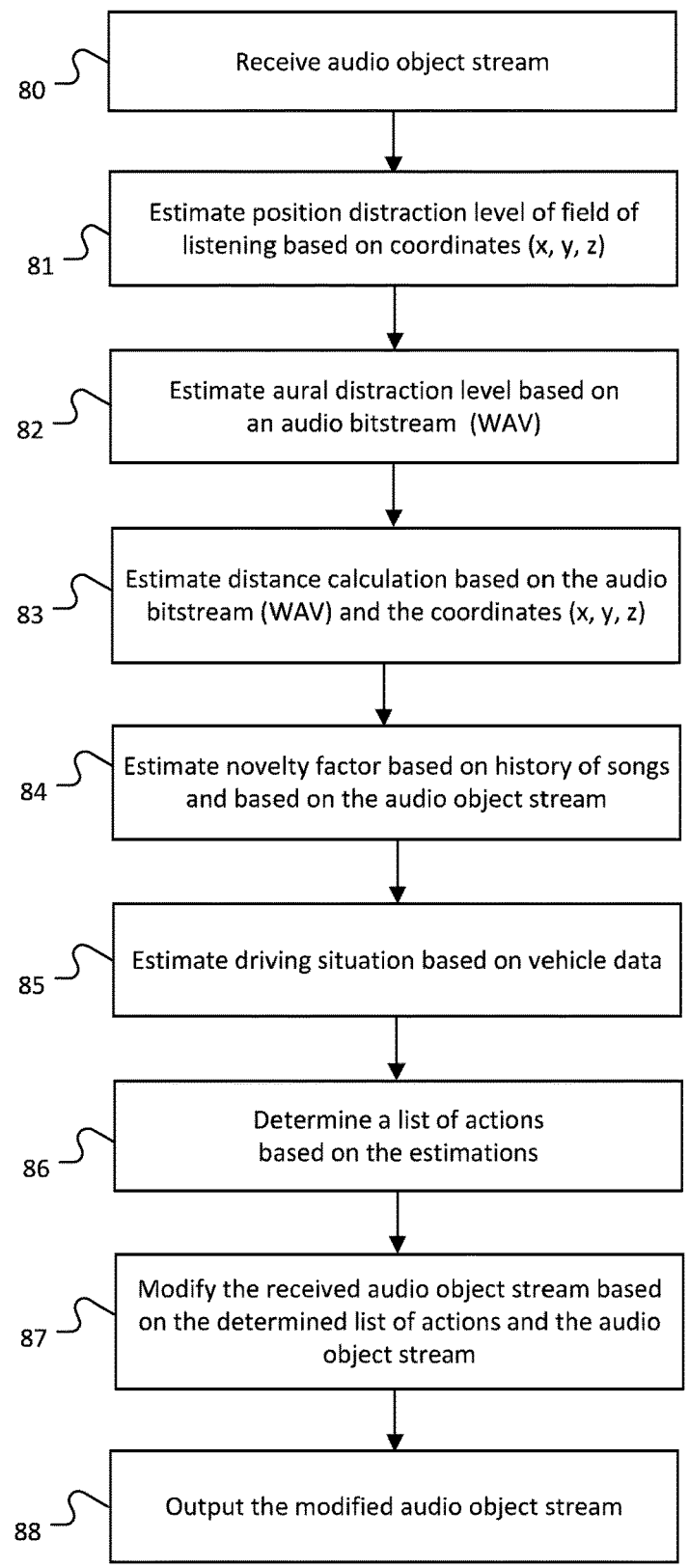
FIG. 12b shows a flow diagram visualizing an exemplary method for performing audio stream modification as described in FIG. 2b.

FIG. 12b shows a flow diagram visualizing an exemplary method for performing audio stream modification as described in FIG. 2b;

At 80, an audio object stream (see 1 in FIG. 2b) is received and at 81, a field of listening evaluation (see 10 in FIGS. 2b and 3) is performed on the received audio object stream based on coordinates (x, y, z) of audio objects to estimate a position distraction level (see 21 in FIGS. 2b and 3). At 82, a sound signature estimation (see 11 in FIGS. 2b and 5a) is performed on the audio object stream based on an audio bitstream (see 30 in FIG. 5a) of the audio object stream to estimate an aural distraction level (see 31 in FIG. 5a) related to the audio bitstream. At 83, a distance calculation (see 12 in FIGS. 2b and 6) is performed on the audio object stream based on coordinates (x, y, z) of audio objects and on an audio bitstream to obtain a distance estimation (see 40, 41, 42, 43 in FIG. 6). At 84, a song history analysis (see 17 in FIGS. 2b and 8) is performed based on history of songs (see 16 in FIGS. 2*b* and 8) and based on the audio object stream to estimate novelty factor (see 46 in FIGS. 2*b* and 8). At 85, a driving situation analysis (see 14 in FIGS. 2*b* and 7) is performed based on acquired vehicle data to estimate a driving situation (see 45 in FIGS. 2*b* and 8). At 86, a list of actions is determined by a decision tree (see 5 in FIG. 2*b*) based on input estimations, such as the estimated position distraction level, the estimated aural distraction level, the distance estimation, the novelty factor and/or the driving situation. At 87, the received audio object stream is modified by an action block (see 6 in FIG. 2*b*) based on the determined list of actions and the audio object stream. At 88, the modified audio object stream is output, for example to a loudspeaker array of a vehicle, in an in-vehicle scenario.

Automotive Implementation

The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 13:
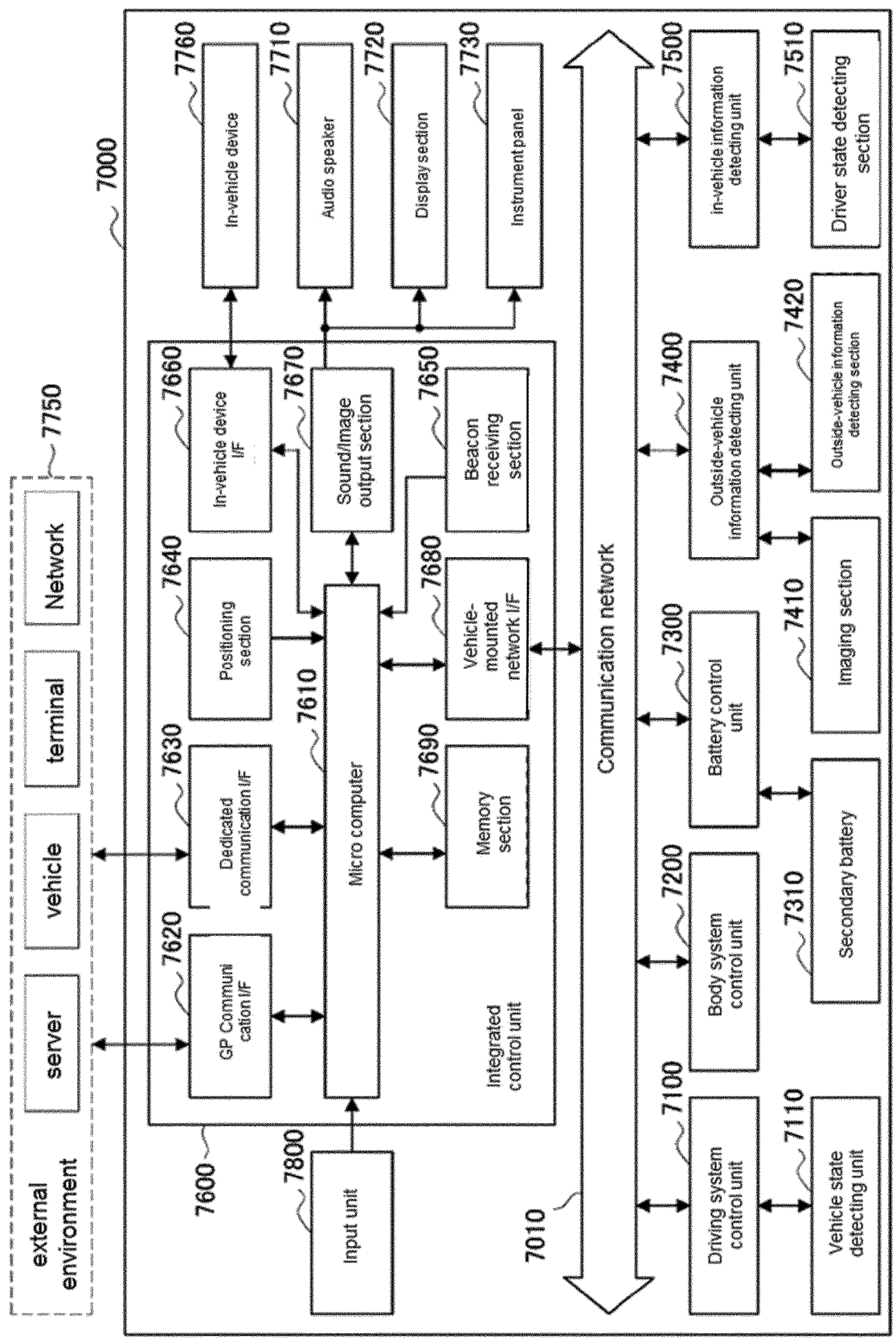
FIG. 13 shows a block diagram depicting an example of schematic configuration of a vehicle control system.

FIG. 13 shows a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. The driving system control unit 7100 may have a function as a control device of an antilock brake system (ABS), electronic stability control (ESC), or the like.

The driving system control unit 7100 is connected with a vehicle state detecting section 7110. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like.

The battery control unit 7300 controls a secondary battery 7310, which is a power supply source for the driving motor, in accordance with various kinds of programs.

The outside-vehicle information detecting unit 7400 detects information (see vehicle data 13 in FIGS. 2*b* and 7) about the outside of the vehicle including the vehicle control system 7000. For example, the outside-vehicle information detecting unit 7400 (see driving situation analyzer 14 in FIGS. 2*b* and 7) is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The in-vehicle information detecting unit 7500 detects information about the inside of the vehicle. The in-vehicle information detecting unit 7500 may collect any information related to a situation related to the vehicle. The in-vehicle information detecting unit 7500 is, for example, connected with a driver and/or passengers state detecting section 7510 that detects the state of a driver and/or passengers. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 (see driving situation analyzer 14 in FIGS. 2*b* and 7) may calculate a degree of fatigue of the driver or a degree of concentration of the driver or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like.

The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640 (see position calculator 12 in FIG. 6), for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point or may obtain the positional information from a terminal such as a mobile telephone, a personal handphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. The microcomputer 7610 may implement the functionality described in FIG. 1 and FIGS. 2a and 2b and in particular the processes describes in FIGS. 3, 5a, 6, 7, 8, 9 and FIG. 10. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal, e.g. modified audio signal, (see modified audio object stream 4 in FIGS. 1, 2a and 2b) of at least one of a sound and an image to an output device capable of visually or auditorily notifying information to an occupant of the vehicle or the outside of the vehicle. In the example of FIG. 13 an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the electronic device according to the present embodiment described with reference to FIGS. 2a and 2b can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

Figure 14:
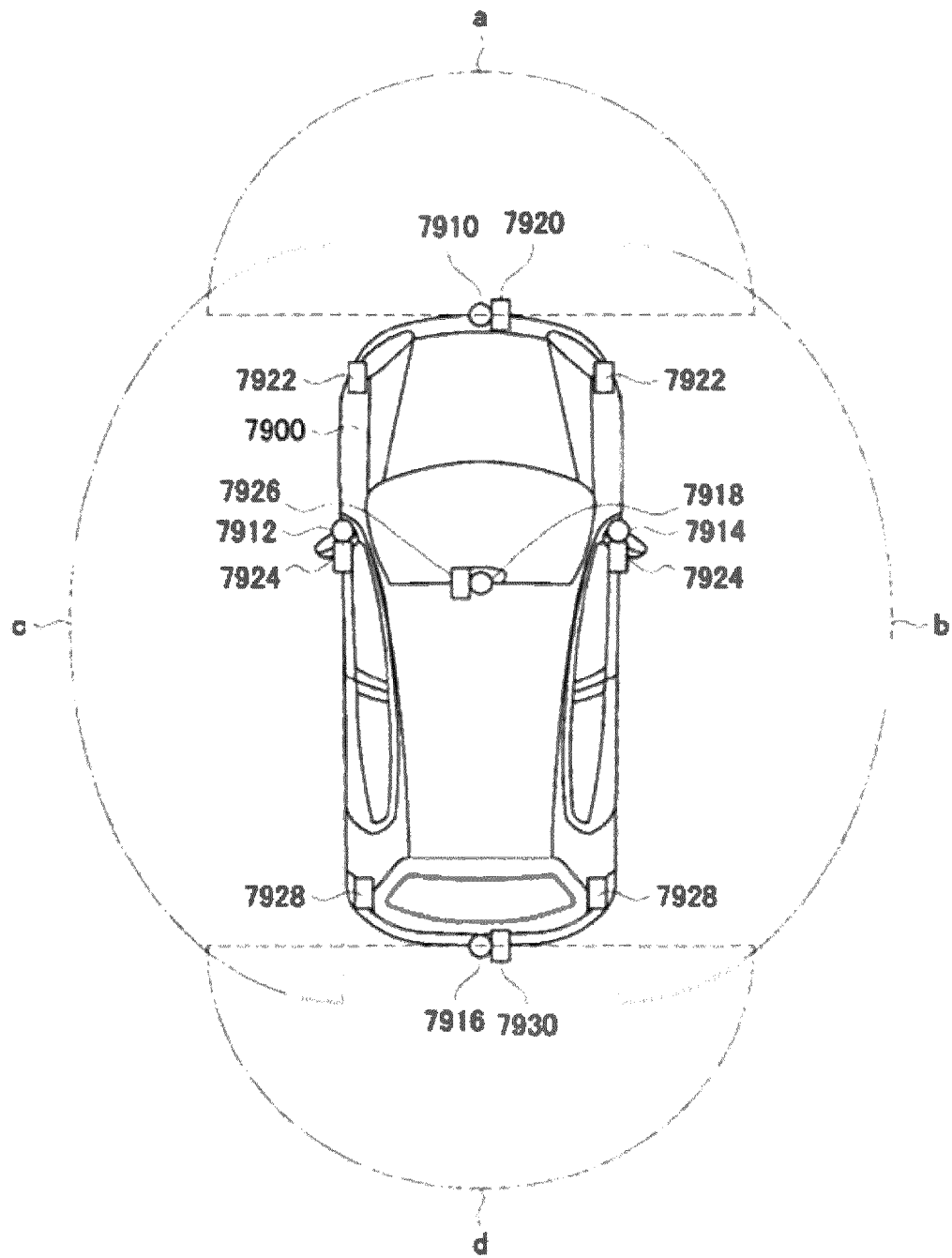
FIG. 14 shows an example of installation positions of the imaging section and the outside-vehicle information detecting section.

FIG. 14 shows an example of installation positions of the imaging section 7410 and the outside-vehicle information detecting section 7420. Imaging sections 7910, 7912, 7914, 7916, and 7918 are, for example, disposed at at least one of positions on a front nose, side-view mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the side-view mirrors. An imaging range d represents the imaging range of the imaging section 7916 provided to the rear bumper or the back door.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Figure 15:
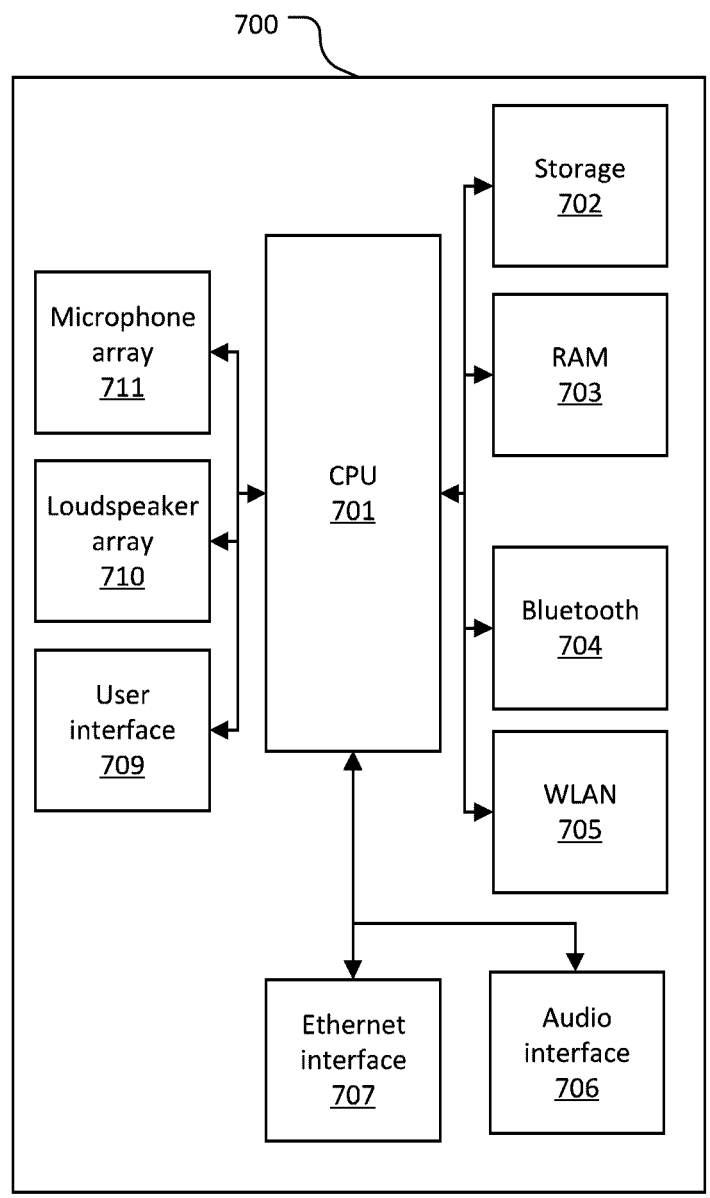
FIG. 15 shows a block diagram depicting an example of schematic configuration of a device implementing a distraction minimization system.

Implementation in Intelligent Personal Assistants FIG. 15 schematically describes an embodiment of an electronic device, related to a vehicle or a household, which implements the process of distraction minimization for playing-back object-based audio material, as described above. The electronic device 700, may also be an electronic system, which comprises a CPU 701 as processor. The electronic device 1300 further comprises a microphone array 711 and a loudspeaker array 710 that are connected to the processor 701. Processor 701 may for example implement a field of listening estimator 10, a sound signature estimator 11, a distance calculator 12, a driving situation analyzer 14, a decision tree 5 that realize the processes described with regard to FIGS. 2a, 2b, 3, 5a, 6, 7, 11a and 11b, in more detail. The microphone array 711 may be configured to receive speech (voice) commands via automatic speech recognition. Loudspeaker array 710 consists of one or more loudspeakers that are distributed over a predefined space and is configured to render 3D audio as described in the embodiments above. The electronic device 700 further comprises an audio interface 706 and a user interface 709 that are connected to the processor 701. This user interface 709 acts as a man-machine interface and enables a dialogue between an administrator and the electronic system. For example, an administrator may make configurations to the system using this user interface 709. The electronic system 700 further comprises an Ethernet interface 707, a Bluetooth interface 704, and a WLAN interface 705. These units 704, 705 act as I/O interfaces for data communication with external devices. For example, additional loudspeakers, microphones, and video cameras with Ethernet, WLAN or Bluetooth connection may be coupled to the processor 701 via these interfaces 707, 704, and 705.

The electronic device 700 further comprises a data storage 702 and a data memory 703 (here a RAM). The data memory 703 is arranged to temporarily store or cache data or computer instructions for processing by the processor 701. The data storage 702 is arranged as a long term storage, e.g., for recording sensor data obtained from the microphone array 711. The data storage 702 may also store audio data that represents audio messages, which the public announcement system may transport to people moving in the predefined space.

The electronic device of FIG. 15 may for example be used in a smart speaker, or the like.

Via the Ethernet interface 707 or the WLAN interface 705, the electronic device of FIG. 15 may be connected to a telephone system to receive incoming calls.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is however given for illustrative purposes only and should not be construed as binding.

It should also be recognized that the division of the electronic system of FIG. 15 into units is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to estimate (2) a distraction level of an audio object stream (1), and to modify (3) the audio object stream based on the estimated distraction level to obtain a modified audio object stream (4).

(2) The electronic device of (1), wherein the circuitry is further configured to modify the audio object stream (1) based on the estimated distraction level by an audio object stream modification including a decision tree.

(3) The electronic device of anyone of (1) or (2), wherein the circuitry is configured to perform a field-of-listening evaluation (10) on the audio object stream (1) to estimate a position distraction level (21).

(4) The electronic device of anyone of (1) to (3), wherein the circuitry is configured to perform a sound signature estimation (11) on the audio object stream (1) to estimate an aural distraction level (31).

(5) The electronic device of anyone of (1) to (4), wherein the circuitry is configured to perform a distance calculation (12) on the audio object stream (1) to obtain a distance estimation (40, 41, 42, 43).

(6) The electronic device of (5), wherein the distance estimation (40, 41, 42, 43) comprises a perceived distance (40), a perceived velocity vector (41), a cross-correlation (42), and/or an auto-correlation (43).

(7) The electronic device of (2), wherein the circuitry is further configured to evaluate the decision tree (5) to determine a list of actions.

(8) The electronic device of (7), wherein the circuitry is further configured to perform an action block (6) to obtain the modified audio object stream (4).

(9) The electronic device of anyone of (1) to (8), wherein the circuitry is further configured to perform a driving situation analysis (14) based on acquired vehicle data (13) to estimate a driving situation (45).

(10) The electronic device of (9), wherein a level of criticalness of a current driving situation is estimated based on the driving situation (45).

(11) The electronic device of anyone of (1) to (9), wherein the circuitry is further configured to perform a song history analysis (17) on a history of songs (16) to estimate a novelty factor (46) related to the audio object stream (1).

(12) The electronic device of anyone of (1) to (11), wherein the circuitry is further configured to extract coordinates (20) of an audio object in the audio object stream (1).

(13) The electronic device of (12), wherein the coordinates (20) of an audio object represent a position of the audio object in a field of listening.

(14) The electronic device of anyone of (1) to (13), wherein the circuitry is further configured to extract spectral and temporal characteristics of the audio object stream from a bitstream (30).

(15) The electronic device of (14), wherein an aural distraction level (31) is estimated based on the obtained audio bitstream (30).

(16) The electronic device of (7), wherein the list of actions includes an amplitude reduction of an audio object (48), a low-pass/median filtering (49), and/or a modification of position (50).

(17) The electronic device of anyone of (1) to (16), wherein the circuitry is further configured to perform distraction minimization in the audio object stream (1) to obtain the modified audio object stream (4).

(18) The electronic device of (6), wherein the circuitry is further configured to extract coordinates and a bitstream to obtain the perceived distance (40), the perceived velocity vector (41), the cross-correlation (42), and/or the auto-correlation (43).

(19) A computer program comprising instructions, the instructions when executed on a processor causing the processor to estimate (2) a distraction level of an audio object stream (1), and to modify (3) the audio object stream based on the estimated distraction level to obtain a modified audio object stream (4).

(20) The electronic device of (1), wherein the circuitry is further configured to output the modified audio object stream to a loudspeaker system.

(21) The electronic device of (1), wherein the circuitry is further configured to reduce a distraction level of a driver based on the modified audio object stream outputted to a loudspeaker system of a vehicle.

(22) The electronic device of (3), wherein the field of listening evaluation estimates the position distraction level (21) based on extracted coordinates (20) of an audio object in the audio object stream (1).

(23) The electronic device of anyone of (1) to (22), wherein the distraction level is a position distraction level, a distance estimation, an aural distraction level, a novelty factor and/or a driving situation.

(24) The electronic device of (5), wherein a distance distraction level is estimated based on the distance estimation.

(25) The electronic device of (9), wherein a driving distraction level is estimated based on the driving situation (45).

(26) The electronic device of (11), wherein a novelty distraction level is estimated based on the novelty factor (46).

(27) A method comprising estimating (2) a distraction level of an audio object stream (1), and modifying (3) the audio object stream (1) based on the estimated distraction level to obtain a modified audio object stream (4).

(28) The method of (27), wherein the method comprises modifying the audio object stream (1) based on the estimated distraction level by an audio object stream modification including a decision tree.

(29) The method of anyone of (27) or (28), wherein the method comprises performing a field-of-listening evaluation (10) on the audio object stream (1) to estimate a position distraction level (21).

(30) The method of anyone of (27) to (29), wherein the method comprises performing a sound signature estimation (11) on the audio object stream (1) to estimate an aural distraction level (31).

(31) The method of anyone of (27) to (30), wherein the method comprises performing a distance calculation (12) on the audio object stream (1) to obtain a distance estimation (40, 41, 42, 43).

(32) The method of (31), wherein the distance estimation (40, 41, 42, 43) comprises a perceived distance (40), a perceived velocity vector (41), a cross-correlation (42), and/or an auto-correlation (43).

(33) The method of (28), wherein the method further comprises evaluating the decision tree (5) to determine a list of actions.

(34) The method of (33), wherein the method further comprises performing an action block (6) to obtain the modified audio object stream (4).

(35) The method of anyone of (27) to (34), wherein the method further comprises performing a driving situation analysis (14) based on acquired vehicle data (13) to estimate a driving situation (45).

(36) The method of (35), wherein a level of criticalness of a current driving situation is estimated based on the driving situation (45).

(37) The method of anyone of (27) to (36), wherein the method further comprises performing a song history analysis (17) on a history of songs (16) to estimate a novelty factor (46) related to the audio object stream (1).

(38) The method of anyone of (27) to (37), wherein the method further comprises extracting coordinates (20) of an audio object in the audio object stream (1).

(39) The method of (38), wherein the coordinates (20) of an audio object represent a position of the audio object in a field of listening.

(40) The method of anyone of (27) to (39), wherein the method further comprises extracting spectral and temporal characteristics of the audio object stream from a bitstream (30).

(41) The method of (40), wherein an aural distraction level (31) is estimated based on the obtained audio bitstream (30).

(42) The method of (33), wherein the list of actions includes an amplitude reduction of an audio object (48), a low-pass/median filtering (49), and/or a modification of position (50).

(43) The method of anyone of (27) to (42), wherein the method further comprises performing distraction minimization in the audio object stream (1) to obtain the modified audio object stream (4).

(44) The method of (32), wherein the method further comprises extracting coordinates and a bitstream to obtain the perceived distance (40), the perceived velocity vector (41), the cross-correlation (42), and/or the auto-correlation (43).

(45) The method of (27), wherein the method further comprises outputting the modified audio object stream to a loudspeaker system.

(46) The method of (27), wherein the method further comprises reducing a distraction level of a driver based on the modified audio object stream outputted to a loudspeaker system of a vehicle.

The invention claimed is:

1. An electronic device comprising:
   circuitry configured to
      estimate a distraction level of an audio object stream,
      perform a field-of-listening evaluation on the audio object stream to estimate a position distraction level corresponding to the distraction level, and
      modify the audio object stream based on the estimated distraction level to obtain a modified audio object stream.

2. The electronic device of claim 1, wherein the circuitry is further configured to modify the audio object stream based on the estimated distraction level by an audio object stream modification including a decision tree.

3. The electronic device of claim 2, wherein the circuitry is further configured to evaluate the decision tree to determine a list of actions.

4. The electronic device of claim 3, wherein the circuitry is further configured to perform an action block to obtain the modified audio object stream.

5. The electronic device of claim 3, wherein the list of actions includes an amplitude reduction of an audio object, a low-pass/median filtering, and/or a modification of position.

6. The electronic device of claim 1, wherein the circuitry is configured to perform a sound signature estimation on the audio object stream to estimate an aural distraction level.

7. The electronic device of claim 6, wherein the circuitry is configured to perform the sound signature estimation on the audio object stream using a deep neural network.

8. The electronic device of claim 1, wherein the circuitry is configured to perform a distance calculation on the audio object stream to obtain a distance estimation.

9. The electronic device of claim 8, wherein the distance estimation comprises a perceived distance, a perceived velocity vector, a cross-correlation, and/or an auto-correlation.

10. The electronic device of claim 9, wherein the circuitry is further configured to extract coordinates and a bitstream to obtain the perceived distance, the perceived velocity vector, the cross-correlation, and/or the auto-correlation.

11. The electronic device of claim 1, wherein the circuitry is further configured to perform a driving situation analysis based on acquired vehicle data to estimate a driving situation.

12. The electronic device of claim 11, wherein a level of criticalness of a current driving situation is estimated based on the driving situation.

13. The electronic device of claim 1, wherein the circuitry is further configured to perform a song history analysis on a history of songs to estimate a novelty factor related to the audio object stream.

14. The electronic device of claim 1, wherein the circuitry is further configured to extract coordinates of an audio object in the audio object stream.

15. The electronic device of claim 14, wherein the coordinates of an audio object represent a position of the audio object in a field of listening.

16. The electronic device of claim 1, wherein the circuitry is further configured to extract spectral and temporal characteristics of the audio object stream from a bitstream.

17. The electronic device of claim 16, wherein an aural distraction level is estimated based on the obtained audio bitstream.

18. The electronic device of claim 1, wherein the circuitry is further configured to perform distraction minimization in the audio object stream to obtain the modified audio object stream.

19. A method comprising:
estimating a distraction level of an audio object stream;
performing a field-of-listening evaluation on the audio object stream to estimate a position distraction level corresponding to the distraction level; and
modifying the audio object stream based on the estimated distraction level to obtain a modified audio object stream.

20. A non-transitory computer-readable medium including computer-readable instructions that, when executed by a processor cause the processor to perform a method comprising:
estimating a distraction level of an audio object stream;
performing a field-of-listening evaluation on the audio object stream to estimate a position distraction level corresponding to the distraction level; and
modifying the audio object stream based on the estimated distraction level to obtain a modified audio object stream.

* * * * *